United States Patent
Choi et al.

(10) Patent No.: US 11,496,553 B1
(45) Date of Patent: Nov. 8, 2022

(54) CODING AND INCENTIVE-BASED MECHANISM FOR DISTRIBUTED TRAINING OF MACHINE LEARNING IN IOT

(71) Applicant: KOREA ADVANCED INSTITUTE OF SCIENCE AND TECHNOLOGY, Daejeon (KR)

(72) Inventors: JunKyun Choi, Daejeon (KR); Nakyoung Kim, Daejeon (KR); Dae-Jin Kim, Daejeon (KR); Hyunseo Park, Deajeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/477,596

(22) Filed: Sep. 17, 2021

(30) Foreign Application Priority Data

May 3, 2021 (KR) .......................... 10-2021-0057467

(51) Int. Cl.
  *H04L 67/10* (2022.01)
  *G16Y 10/75* (2020.01)
  *G06N 20/00* (2019.01)

(52) U.S. Cl.
  CPC .............. *H04L 67/10* (2013.01); *G16Y 10/75* (2020.01); *G06N 20/00* (2019.01)

(58) Field of Classification Search
  CPC ............................... H04L 67/10; G06N 20/00
  See application file for complete search history.

(56) References Cited

U.S. PATENT DOCUMENTS 11,212,183 B1 * 12/2021 Hankins ................ H04L 43/026
2014/0278210 A1 * 9/2014 Krauss .................... G01B 21/04
                                                    702/150

(Continued)

OTHER PUBLICATIONS

R. Tandon, Q. Lei, A. G. Dimakis, and N. Karampatziakis, "Gradient Coding: Avoiding Stragglers in Distributed Learning," in Proc. Int. Conf. Machine Learning (ICML), vol. 70, Aug. 2017, pp. 3368-3376.

(Continued)

*Primary Examiner* — El Hadji M Sall
(74) *Attorney, Agent, or Firm* — Bond Schoeneck & King, PLLC; George McGuire

(57) ABSTRACT

A coding and Incentive-based distributed computing management system includes: a parameter server that publishes a gradient descent computation task to update parameters of distributed computing, sends the published task to end devices, and groups end devices into clusters by receiving related information from the plurality of end devices, determines the number of stragglers in each cluster and sends the number of stragglers to the end devices, along with an encoding scheme for gradient descent computation, and distributes incentive to the end devices based on encoded results and the end devices that receive the published task from the parameter server, sends an intention to participate in the published task and related information to the parameter server, determines CPU-cycle frequencies by receiving information on the grouping of the end devices and related information from the parameter server, and performs encoding for gradient descent computation and send a computed gradient to the parameter server.

16 Claims, 14 Drawing Sheets

(56) References Cited

U.S. PATENT DOCUMENTS

2018/0300174 A1* 10/2018 Karanasos ............ G06F 9/4881
2019/0104121 A1* 4/2019 Khandani ........... H04L 63/0876
2021/0211515 A1* 7/2021 Rozo ......................... G06F 7/00

OTHER PUBLICATIONS

M. J. Osborne and A. Rubinstein, a Course in Game Theory. Cambridge, Jun. 1994.

E. Koutsoupias and C. H. Papadimitriou, "Worst-case equilibria," Comput. Sci. Rev., vol. 3, No. 2, pp. 65-69, May 2009.

K. Lee, M. Lam, R. Pedarsani, D. Papailiopoulos, and K. Ramchandran, "Speeding Up Distributed Machine Learning Using Codes," IEEE Trans. Inf. Theory, vol. 64, No. 3, pp. 1514-1529, Mar. 2018.

A. Reisizadeh, S. Prakash, R. Pedarsani, and A. S. Avestimehr, "Coded Computation Over Heterogeneous Clusters," IEEE Trans. Inf. Theory, vol. 65, No. 7, pp. 4227-4242, Jul. 2019.

D. Kim, H. Park, and J. Choi, "Optimal Load Allocation for Coded Distributed Computation in Heterogeneous Clusters," IEEE Trans. Commun., Oct. 2020.

J. Zhang and O. Simeone, "On Model Coding for Distributed Inference and Transmission in Mobile Edge Computing Systems," IEEE Commun. Lett., vol. 23, No. 6, pp. 1065-1068, Jun. 2019.

S. Zhao, "A Node-Selection-Based Sub-Task Assignment Method for Coded Edge Computing," IEEE Commun. Lett., vol. 23, No. 5, pp. 797-801, May 2019.

M. Ye and E. Abbe, "Communication-Computation Efficient Gradient Coding," in Proc. Int. Conf. Machine Learning (ICML), vol. 80, Jul. 2018, pp. 5606-5615.

W. Halbawi, N. Azizan, F. Salehi, and B. Hassibi, "Improving Distributed Gradient Descent Using Reed-Solomon Codes," in IEEE Int. Symp. Inf. Theory (ISIT), Jun. 2018, pp. 2027-2031.

L. Duan, T. Kubo, K. Sugiyama, J. Huang, T. Hasegawa, and J. Walrand, "Motivating Smartphone Collaboration in Data Acquisition and Distributed Computing," IEEE Trans. Mobile Comput., vol. 13, No. 10, pp. 2320-2333, Oct. 2014.

J. Kang, Z. Xiong, D. Niyato, S. Xie, and J. Zhang, "Incentive Mechanism for Reliable Federated Learning: A Joint Optimization Approach to Combining Reputation and Contract Theory," IEEE Internet of Things J., vol. 6, No. 6, pp. 10 700-10 714, Dec. 2019.

X. Wang, J. He, P. Cheng, and J. Chen, "Privacy Preserving Collaborative Computing: Heterogeneous Privacy Guarantee and Efficient Incentive Mechanism," IEEE Trans. Signal Process., vol. 67, No. 1, pp. 221-233, Jan. 2019.

X. Wang, X. Chen, W. Wu, N. An, and L. Wang, "Cooperative Application Execution in Mobile Cloud Computing: A Stackelberg Game Approach," IEEE Commun. Lett., vol. 20, No. 5, pp. 946-949, May 2016.

M. Liu and Y. Liu, "Price-Based Distributed Offloading for Mobile-Edge Computing With Computation Capacity Constraints," IEEE Commun. Lett., vol. 7, No. 3, pp. 420-423, Dec. 2018.

Y. Liu, C. Xu, Y. Zhan, Z. Liu, J. Guan, and H. Zhang, "Incentive mechanism for computation offloading using edge computing: A Stackelberg game approach," Comput. Networks, vol. 129, pp. 399-409, Mar. 2017.

W. Wei, X. Fan, H. Song, X. Fan, and J. Yang, "Imperfect Information Dynamic Stackelberg Game Based Resource Allocation Using Hidden Markov for Cloud Computing," IEEE Trans. Serv. Comput., vol. 11, No. 1, pp. 78-89, Feb. 2018.

D. Yang, G. Xue, X. Fang, and J. Tang, "Incentive Mechanisms for Crowdsensing: Crowdsourcing With Smartphones," IEEE/ACM Trans. Netw., vol. 24, No. 3, pp. 1732-1744, Jun. 2016.

J. Dean, G. Corrado, R. Monga, K. Chen, M. Devin, M. Mao, M. Aurelio Ranzato, A. Senior, P. Tucker, K. Yang, Q. V. Le, and A. Y. Ng, "Large Scale Distributed Deep Networks," in Proc. Adv. Neural Inform. Process. Syst. (NIPS), Dec. 2012, pp. 1223-1231.

J. Chen, X. Pan, R. Monga, S. Bengio, and R. Jozefowicz, "Revisiting Distributed Synchronous SGD," in Proc. Int. Conf. Learning Representations (ICLR), Apr. 2017, pp. 1-11.

M. Zinkevich, M. Weimer, L. Li, and A. J. Smola, "Parallelized Stochastic Gradient Descent," in Proc. Adv. Neural Inform. Process. Syst. (NIPS), Dec. 2010, pp. 2595-2603.

* cited by examiner

Algorithm 1 Best response of PS
---
1: Input: $L, c, \mu, n, f, \delta$

2: for $i \in [M]$ do
3: $\quad \bar{s}_i^* = \frac{c_i f_i}{L \mu_i}$
4: $\quad s_i^{(1)} = \underset{s_i \in \delta_i}{\operatorname{argmin}} |\bar{s}_i^* - s_i|$
5: $\quad s_i^{(2)} = \underset{s_i \in [\delta_i \setminus s_i^{(1)}]}{\operatorname{argmin}} |\bar{s}_i^* - s_i|$
6: $\quad$ if $\bar{\Phi}_i\left(s_i^{(1)}, s_{-i}; f_i\right) \leq \bar{\Phi}_i\left(s_i^{(2)}, s_{-i}; f_i\right)$ then
7: $\quad\quad s_i^* = s_i^{(1)}$
8: $\quad$ else
9: $\quad\quad s_i^* = s_i^{(2)}$
10: $\quad$ end if
11: end for

12: output: $s^*$
---

Algorithm 2 Best Response of $ED_i$:

1: Input: $p_{task}, p_{md}, R^b, R^c, f_{-i}, \mathcal{F}_i, \tilde{\mathcal{F}}_i$ 2: $f_i^0 = \{f \in \mathbb{R}^+ \mid \Omega_i(f) = 0\}$
3: if $f_i^0 \in \tilde{\mathcal{F}}_i$ then
4: $\quad \tilde{f}_i^* = f_i^0$
5: else
6: $\quad f_i^{lb} = \{f \in \mathcal{F}_i \mid f \geq \tilde{f}, \text{ for all } \tilde{f} \in \mathcal{F}_i\}$
7: $\quad f_i^{ub} = \{f \in \mathcal{F}_i \mid f \leq \tilde{f}, \text{ for all } \tilde{f} \in \mathcal{F}_i\}$
8: $\quad$ if $\Psi_i(f_i^{lb}; f_{-i}) \geq \Psi_i(f_i^{ub}; f_{-i})$ then
9: $\quad\quad \tilde{f}_i^* = f_i^{lb}$
10: $\quad$ else
11: $\quad\quad \tilde{f}_i^* = f_i^{ub}$
12: $\quad$ end if
13: end if

14: $f_i^{(1)} = \underset{f_i \in \mathcal{F}_i}{\operatorname{argmin}} |\tilde{f}_i^* - f_i|$
15: $f_i^{(2)} = \underset{f_i \in \{\mathcal{F}_i \setminus f_i^{(1)}\}}{\operatorname{argmin}} |\tilde{f}_i^* - f_i|$
16: if $\Psi_i(f_i^{(1)}; f_{-i}) \geq \Psi_i(f_i^{(2)}; f_{-i})$ then
17: $\quad f_i^* = f_i^{(1)}$
18: else
19: $\quad f_i^* = f_i^{(2)}$
20: end if

21: output: $f_i^*$

Algorithm 3 Best-response Dynamics of EDs
---

1: Input: $p_{task}, p_{md}, R^b, R^c, f, \mathscr{F}, \bar{\mathscr{F}}$

2: $f^* = \{f \in \mathscr{F}_i \mid f \geq \tilde{f}, \text{ for all } \tilde{f} \in \mathscr{F}_i\}$
3: while $\exists i \in [M], f_i^* \neq f_i$ do
4:     $\tilde{M} \leftarrow$ randomly sort $[M]$
5:     for $i = \tilde{M}$ do
6:         $f_i = f_i^*$
7:         $f_i^* =$ Algorithm 2
8:     end for
9: end while

10: output: $f^*$

Algorithm 4 NE of DC Stackelberg Game
---
1: Input: $p_{task}$, $p_{md}$, $R$ 2: for $i \in [M]$ do
3:      $\mathcal{S}_i = [n_i]$
4:      $\mathcal{F} = \{f \in \mathbb{R} \mid f_i^{min} \leq f \leq f_i^{max}\}$
5:      $f_i^{lb} = \min\left\{f \in \mathcal{F} \mid f = q\frac{L\mu_i}{c_i}, \text{ for some } q \in \mathcal{S}_i\right\}$
6: end for

7: $r^{max} = \max_{i \in [M]}\left\{\eta_i \kappa_i \left[\frac{(f_i^{lb})^3}{\mu_i} + \frac{L(f_i^{lb})^2}{c_i}\right] + \eta_i C_i^{tx}\right\}$ 8: $R^b = \sum_{i=1}^{M} n_i (r^{max} + \epsilon)$ 9: $R^c = R - R^b$ 10: for $i \in [M]$ do
11:      $\mathcal{H}_i = \left\{f \in \mathbb{R} \mid (f_i^{lb} \leq f \leq f_i^{max}) \wedge \left(\psi_i^{(2)}(f) \geq \epsilon\right)\right\}$
12:      $f_i^{ub} = \max\left\{f \in \mathcal{H}_i \mid f = q\frac{L\mu_i}{c_i}, \text{ for some } q \in \mathcal{S}_i\right\}$
13:      $\bar{\mathcal{F}}_i = \{f \in \mathbb{R} \mid f_i^{lb} \leq f \leq f_i^{ub}\}$
14:      $\mathcal{F}_i = \left\{f \in \bar{\mathcal{F}}_i \mid f = q\frac{L\mu_i}{c_i}, \text{ for some } q \in \mathcal{S}_i\right\}$
15:      $f_i = \{f \in \mathcal{F}_i \mid f \leq \tilde{f}, \text{ for all } \tilde{f} \in \mathcal{F}_i\}$
16: end for

17: $f^* =$ Algorithm 3
18: $s^* =$ Algorithm 1

19: output: $f^*$, $s^*$

CODING AND INCENTIVE-BASED MECHANISM FOR DISTRIBUTED TRAINING OF MACHINE LEARNING IN IOT

CROSS-REFERENCE TO RELATED APPLICATION

This application claims the priority benefit of Korean Patent Application No. 10-2021-0057467, filed on May 3, 2021, in the Korean Intellectual Property Office, the disclosure of which is incorporated herein by reference.

BACKGROUND OF THE DISCLOSURE

Field of the Disclosure

The present disclosure relates to an incentive-based coding and incentive-based distributed computing management method and system for latency reduction in IoT services. This work was supported by Institute of Information & Communications Technology Planning & Evaluation (IITP) grant funded by the Korea government (MSIT) (No. 2021-000269, Development of sub-THz band wireless transmission and access core technology for 6G Tbps data rate).

Related Art

Distributed computing has been rapidly emerging as a popular computing paradigm driven by a growing demand for analytics and learning of big data generated from the massive Internet of Things (IoT) devices. This is enabled by innovations and advancements of modern computer networking (e.g. wired and wireless communication) and virtualization technology. Recently, various use cases that adopt such distributed computing are exemplified by federated learning on local devices, interconnected autonomous vehicles, augmented reality implementation on smartphones, etc. Specifically, leveraging the aggregation of computing resources over multiple nodes, which is ranging from devices with limited resources to large computing clusters, can speed up big data analytics on deep learning frameworks, such as Tensorflow and Pytorch. Nevertheless, due to the nature of the involvement of heterogeneous computing nodes with different interests and status (e.g., computing and networking conditions), such distributed computing requires to overcome a few challenges to manage it efficiently and reliably. That is, 1) reducing the latency of the computation on heterogeneous computing nodes, and 2) motivating self-interested computing nodes to participate in the computation.

In large-scale distributed computing, nodes that cause delays are known as stragglers. The stragglers have been a critical issue in distributed computing as they incur an increase in computation latency, which is often referred to as straggling effect. Various approaches to speed up distributed computing were disclosed in the conventional art. However, the straggling effect often arises for compound reasons, and eliminating all of its sources is impractical in large-scale distributed computing. As a tool to manage the straggling effect, coding theoretical techniques have shown their productivity on speeding up the distributed computation in many applications, including big data analytics and machine learning.

Coding schemes for distributed computing according to the conventional art deliberately construct additional data processing and data assignment such that distributively processed results can be aggregated with a subset of the results. That is, the coding schemes utilize additional computation resources by introducing redundant computations to mitigate the straggling effect in distributed computing, which is called coded distributed computing. This implies that the latency of distributed computing can decrease with an appropriate level of redundancy in the computation and deliberate load allocations to computing nodes. Accordingly, coding schemes are recently applied and investigated in distributed computing for data analytics and machine learning to speed up the processing of data by mitigating the straggling effect, which is caused by the computing nodes' resource limitations or network conditions. Meanwhile, the introduction of coding schemes complicates the distributed computing problems as the latency and workload of distributed computing tasks depend on how coding schemes are constructed. Differently from distributed computing without a coding scheme, there is a trade-off between latency reduction achieved by alleviating the straggling effect of computing nodes and latency increment incurred from additional data processing for coding, which should be carefully balanced. Hence, coded distributed computing requires an approach to efficiently execute computations over computing nodes in different conditions. Consequently, many recent works in the conventional art have studied coding schemes on various types of computations for machine learning in a distributed structure (e.g., matrix multiplication, data shuffling, MapReduce, and gradient descent).

In the meantime, end devices (EDs) have recently received interests as computing nodes for distributed computing due to their advancements in capabilities, close-proximity to data sources, and availability in diverse circumstances. However, distributed computing causes resource utilization accompanied by the energy consumption of the computing nodes. To properly motivate the EDs' participation, such resource dissipation requires to be compensated. An adequate incentive mechanism for EDs leads to their sustainable participation that facilitates low-latency in distributed computing. Especially, for coded distributed computing where a non-trivial amount of computing overheads occur due to the introduction of a coding scheme, the incentive mechanism is required to be elaborately designed. In coded distributed computing, the overall latency and workload dynamically change based on how the coding scheme is constructed. Consequently, the costs incurred in the coded distributed computation vary as well with the coding scheme construction. Hence, an incentive mechanism in coded distributed computing is required to adaptively compensate the dynamically varying processing costs of the computing nodes. In other words, there is a need for a coded distributed computing technique that jointly considers an incentive mechanism for EDs with limited resources as well as relatively unstable network connections.

SUMMARY OF THE INVENTION

A technical aim of the present disclosure is to provide distributed computing mechanisms on heterogeneous end devices (EDs) for latency reduction in Internet of Things (IoT) services by mitigating the effect of straggling EDs. The present disclosure proposes coded distributed computing mechanisms with two different incentive distributions that consider the time-discounting value of processed results and the amount of the workload computed by EDs.

In one aspect, there is provided a coding and Incentive-based distributed computing management system for latency reduction in IoT services proposed in the present disclosure, the system including: a parameter server (PS) that publishes a gradient descent computation task to update parameters of distributed computing, sends the published task to a plurality of end devices, and groups the plurality of end devices into clusters by receiving related information from the plurality of end devices, determines the number of stragglers in each cluster and sends the determined number of stragglers to the plurality of end devices, along with an encoding scheme for gradient descent computation, and distributes incentive to the plurality of end devices based on encoded results; the plurality of end devices (ED) that receive the published task from the parameter server, sends an intention to participate in the published task and related information to the parameter server, determine CPU-cycle frequencies by receiving information on the grouping of the plurality of end devices and related information from the parameter server, and perform encoding for gradient descent computation and send a computed gradient to the parameter server; a base station that communicates with the plurality of end devices via wireless communication so as to enable communication between the plurality of end devices and the parameter server and communicates with the parameter server via a wired link; and a data shard (DS) that stores data processed in the plurality of end devices and the parameter server and comprises local data storage for each of the plurality of end devices.

The plurality of end devices formulate a strategic competition with the parameter server as a Stackelberg game, and the plurality of end devices operating as leaders of the game determine the CPU-cycle frequencies to balance each end device's computing speed and energy consumption for obtaining maximum utility with incentive mechanisms.

The parameter server aims at minimizing latency of the distributed computing, operate as a follower of the Stackelberg game to determine the load allocation for each end device based on the CPU-cycle frequencies determined by the plurality of end devices, and then achieves the Stackelberg equilibrium which is a unique Nash equilibrium of the Stackelberg game.

The plurality of end devices compete with one another to earn incentive by forming a profit maximization (PM) subgame among the plurality of end devices, and, with the best responses of the end devices determined in the PM subgame, the parameter server allocates workload to the corresponding end devices to minimize the task completion latency as a single follower.

The parameter server determines the optimal number of stragglers in each cluster to minimize the task completion latency, determines the load allocation based on the optimal number of stragglers, reformulates a Lagrange dual problem to determine the optimal number of stragglers, and determines the optimal number of stragglers by using an optimal Lagrangian multiplier vector maximizing the Lagrange dual problem.

The parameter server encourages the plurality of end devices to participate by providing base incentive guaranteeing minimum incentive to the plurality of end devices, by using incentive distributions comprising a base incentive distribution and a competition incentive distribution, and, upon receiving processed results from all of the plurality of end devices, distributes competition incentive to the plurality of end devices to provide incentive based on the evaluation results.

The plurality of end devices receive the base incentive, which is equally distributed to all participating end devices to prevent the plurality of end devices' profit from becoming less than a predetermined minimum value.

The competition incentive proportional to the evaluation results of the tasks processed by the plurality of end devices is distributed to the plurality of end devices through the competition among the plurality of end devices to earn the incentive, wherein the evaluation results are obtained based on evaluation criteria comprising workload (WL) and completion time (CT), and workload-based incentive is evaluated with the amount of workload that an end device processed and completion time-based incentive is evaluated with the end device's expected task completion latency.

In another aspect, there is provided a coding and Incentive-based distributed computing management method for latency reduction in IoT services proposed in the present disclosure, the method including: the step in which a parameter server (PS) publishes a gradient descent computation task to update parameters of distributed computing and sends the published task to a plurality of end devices; the step in which the plurality of end devices (EDs) receive the published task from the parameter server and send an intention to participate in the published task and related information to the parameter server; the step in which the parameter server groups the plurality of end devices into clusters by receiving the intention to participate and related information from the plurality of end devices; the step in which the plurality of end devices determine CPU-cycle frequencies by receiving information on the grouping of the plurality of end devices and related information from the parameter server; the step in which the parameter server determines the number of stragglers in each cluster based on the determined CPU-cycle frequencies and sends the determined number of stragglers to the plurality of end devices, along with an encoding scheme for gradient descent computation; the step in which the plurality of end devices perform encoding for gradient descent computation and send a computed gradient to the parameter server; and the step in which the parameter server distributes incentive to the plurality of end devices based on encoded results.

According to embodiments of the present disclosure, the challenges in distributed computing are jointly addressed to mitigate the straggling effect and motivates the participation of computing nodes. By utilizing game-theoretic and coding theoretic approaches, it is possible to solve the problems to reduce the task completion latency and leverage the EDs as computing nodes which are complicated by the introduction of a coding scheme to a distributed computing task since the latency and workload of the EDs dynamically vary based on the construction of the coding scheme. Moreover, each ED competes with the other EDs and maximizes its profit by optimizing the CPU-cycle frequency that balances its computing speed and energy consumption. The PS minimizes the task completion latency by determining the load allocations to the EDs. The PS and EDs compete as well to achieve minimum latency and maximum profits, respectively.

BRIEF DESCRIPTION OF THE DRAWINGS

FIG. 10a to FIG. 10e are views describing a coding and Incentive-based distributed computing management algorithm according to one embodiment of the present disclosure.

DESCRIPTION OF EXEMPLARY EMBODIMENTS

Figure 1:
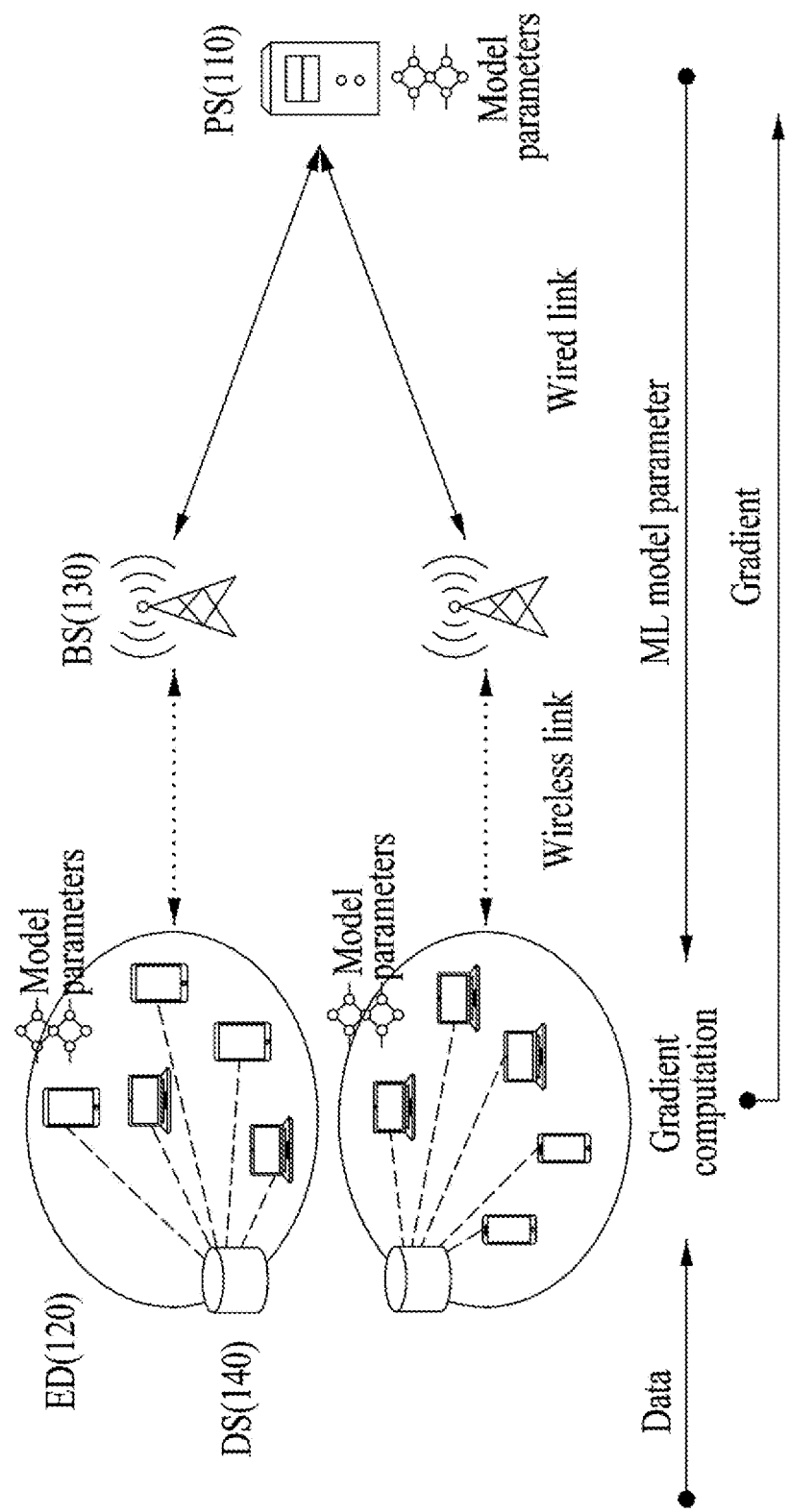
FIG. 1 is an overall schematic view of a coding and Incentive-based distributed computing management system for distributed training of machine learning in IoT according to one embodiment of the present disclosure.

The present disclosure proposes distributed computing mechanisms on heterogeneous end devices (EDs) for latency reduction in Internet of Things (IoT) services by mitigating the effect of straggling EDs. The present disclosure proposes novel coded distributed computing mechanisms with two different incentive distributions that consider the time-discounting value of processed results and the amount of the workload computed by EDs. Specifically, the present disclosure considers distributed gradient descent computing with coding when a parameter server (PS) with a limited amount of budget offers incentives to encourage EDs' participation in the computation. To analyze a hierarchical decision-making structure of the PS and EDs, the present disclosure formulates a strategic competition between the PS and EDs as a Stackelberg game. In the case that the EDs are the leaders, the present disclosure proposes a CPU-cycle frequency control scheme to balance each ED's computing speed and energy consumption for obtaining its maximum utility with the incentive mechanisms. As the follower, the PS aims at minimizing latency of the distributed computing, and it follows the EDs' decisions to determine the load allocation for each ED. The present disclosure, then, proposes an algorithm achieving the Stackelberg equilibrium, which is shown to be a unique Nash equilibrium of the game. An embodiment of the present disclosure will be described in detail with reference to the accompanying drawings.

The present disclosure proposes an coding and Incentive-based distributed computing problem for gradient descent, which utilizes gradient coding proposed in the conventional art technology [19] and leverages prevalent EDs owned by users with different interests and conditions as computing nodes. Specifically, the present disclosure jointly addresses the challenges in distributed computing to mitigate the straggling effect and motivates the participation of computing nodes. The introduction of a coding scheme to a distributed computing task complicates the problems to reduce the task completion latency and utilize the EDs as computing nodes since the latency and workload of the EDs dynamically vary based on the construction of the coding scheme. To solve the complicated problems jointly, the present disclosure utilizes game-theoretic and Langrangian dual approaches.

The present disclosure considers that a parameter server (PS) with a fixed amount of budget publishes a distributed gradient descent computation task. Each ED competes with the other EDs and maximizes its profit by optimizing the CPU-cycle frequency that balances its computing speed and energy consumption. The PS minimizes the task completion latency by determining the load allocations to the EDs. The PS and EDs compete as well to achieve minimum latency and maximum profits, respectively, and the strategical behaviors of the PS and EDs are analyzed in a Stackelberg game model.

To incentivize the EDs with a fixed budget, two criteria that evaluate the worth of the EDs' works are introduced: workload and completion time. From the EDs' perspectives, the computational overheads caused by the trade-offs between the latency and resource consumption are considered in the incentive distribution based on workload. On the other hand, with coding, the PS needs the processed results from only a subset of EDs. This implies that the computations done by the EDs are differently valued to the PS depending on the completion time. Therefore, the incentive distribution based on completion time is considered from the PS's perspective.

The present disclosure proposes incentive mechanisms and investigate their influences in coded distributed computing. In advance of distributing the incentives, the PS verifies the truthfulness of the EDs, such that whether the EDs correctly computed the given task with their announced frequencies, and untruthful EDs are not incentivized and disowned from further computations.

The present disclosure proposes coded distributed computing mechanisms for gradient descent which encourage computing nodes' participation and achieve low-latency for task completion. The conventional technologies of coded distributed computing assume computing nodes' voluntary participation or nondynamic computing speed of heterogeneous devices, which may not be expected in certain scenarios.

Specifically, to motivate the participation of EDs in distributed computing, the present disclosure considers incentive mechanisms that distribute the incentive based on EDs' workloads and completion times. For the incentive mechanism based on the EDs' completion times, the present disclosure proposes to consider the value degradation of processed results in time. With coding, only subsets of the processed results are required to aggregate the intact computation result, which leads to different values for the processed results based on their latency. The proposed incentive mechanism captures the needs for discounting values of the processed results, and the performance evaluation results verify that the proposed incentive mechanism is effective in latency reduction, even when a coding scheme is not applied.

To analyze the interaction among the EDs and the PS according to the embodiment of the present disclosure, their behaviors motivated by economic aspects are modeled in a hierarchical structure. As the PS relies on the computational resources provided by the EDs, the EDs take the lead to make the first action and determine the computing speeds that maximize their profits. The PS determines the load allocation for the EDs to minimize the task completion latency by alleviating the straggling effect. As the rational self-interested EDs are reluctant to participate in distributed computing without proper compensation for its resource dissipation, a coded distributed computing with incentive mechanisms that reduce the task completion latency is proposed.

In the market environment between the EDs and the PS according to the embodiment of the present disclosure, their behavior in a hierarchical decision-making structure is formulated as a Stackelberg game, which is a competitive strategic game between two types of players with hierarchy: leaders and followers [2]. In the proposed approach, the EDs which provide the computational resources lead the competition as leaders. The PS with a limited budget rationally determines its response to the ED's behavior as a follower.

The present disclosure proposes an algorithm that achieves a unique Stackelberg equilibrium with the guarantee of convergence through game-theoretic analysis. It shows that distributed gradient descent computing over a large number of the EDs with an incentive can minimize the latency for the PS and maximize the utilities of the EDs at the Stackelberg equilibrium. The systematical efficiency of the proposed distributed computing mechanism is quantified in a notion of Price of Anarchy (PoA). It is a metric in economics and game theory for the depreciation of a system efficiency due to the selfish behavior of players [3].

Large-scale distributed computing has shown great promise in many applications over recent years, including big data analytics and machine learning. Meanwhile, distributed computing has issues to overcome that are caused by the nature of distributed systems and self-interested computing nodes. The straggling effect in distributed systems requires to be managed while the voluntary cooperation of computing nodes is hard to expect due to their selfish nature. To handle these issues, many researchers have investigated coding schemes and incentive mechanisms to mitigate the straggling effect and to motivate the participation of computing nodes, respectively.

As an approach to speed up distributed computing for machine learning with the presence of stragglers, coding schemes have been recently studied. The conventional technology [4] achieved significant latency reduction for matrix multiplication and data shuffling with MDS (Maximum Distance Separable) code in a homogeneous distributed computing system and verified that coding theoretic approaches can speed up the distributed machine learning computation. Extending the task of [4] to heterogeneous computing nodes in the conventional technologies [5] and [6], load allocation algorithms with MDS code that minimize the latency in distributed matrix multiplications are proposed. In addition, the conventional technology [5] considered the economical costs in distributed computing and proposed a heuristic search algorithm for the optimal computing nodes selection problem with a limited budget. While the aforementioned conventional technologies did not specifically consider wireless communication, the conventional technologies [7] and [8] investigated the distributed matrix multiplication with MDS code for the computing nodes connected through wireless links. In the conventional technology [19], a novel coding scheme, so-called gradient coding, is proposed that provides tolerance to failures and stragglers in a distributed gradient descent computation. Gradient coding deliberately replicates data to mitigate the straggling effect in the synchronous gradient descent computation. The conventional technology [9] additionally considered the communication costs in distributed computing with gradient coding. In the conventional technology [10], gradient coding framework was adopted and a deterministic coding scheme that recovers the gradients from the least number of computing nodes was presented.

Many conventional technologies have proposed a coding scheme and analyzed the effectiveness of coding for latency reduction in distributed computing for machine learning. However, as their primal focus was not developing mechanisms to attract computing nodes for distributed computing, the monetary conditions that motivate the computing nodes' participation were not covered in detail. As computation requires a non-trivial amount of resource dissipation, voluntary participation for unpaid resource sharing is hard to expect in some circumstances. Accordingly, the present disclosure proposes mechanisms that motivate self-interested computing nodes.

In incentive mechanisms for distributed computing, contract theory in the conventional technologies [11] and [20] is adopted in distributed computing to incentivize the participating nodes. The conventional technology [11] proposed a mechanism that rewards the participating EDs based on the type and the amount of task they contract. In the conventional technology [20], a type of distributed computing for learning that preserves data privacy is disclosed. Here, distributed learning with the data locally stored on computing nodes was considered and a reputation-based contract mechanism was proposed to motivate their participation. The privacy concern in distributed computing is considered as well in the conventional technology [13]. Here, an incentive mechanism that compensates the computing nodes' privacy loss incurred in collaborative distributed computing with a limited budget was proposed. In the conventional technology [14], a cooperative mobile computing problem is disclosed, in which the behaviors of EDs and a task owner are modeled as a Stackelberg game. The number of execution units and the unit prices for tasks are determined by the EDs and the task owner, respectively, in the formulated game. In the conventional technologies [15]-[17], incentive mechanisms for mobile-edge and cloud computing are applied in Stackelberg game models as well. Here, Stackelberg games were proposed to determine the computing prices and the computation offloading decisions for mobile users, edge serves, and cloud servers. The conventional technology [18] proposed crowdsourcer-centric and user-centric models for participatory sensing with EDs. For the crowdsourcer-centric model, a Stackelberg game is designed, in which the duration of EDs' sensing time and the total amount of incentive offered by the crowdsourcer are determined. The user-centric model is designed with a reverse auction-based incentive mechanism, which allows users to offer prices for the given tasks and the crowdsourcer to select users.

The conventional technologies on incentive have proposed mechanisms that encourage computing nodes' participation in distributed computing but not considered the robustness of distributed systems. Specifically, the adverse straggling effect in distributed computing is not contemplated in the incentive mechanisms or system designs, which lead to a delay in the computation. The straggling effect cannot be alleviated by simply motivating the computing nodes since the sources of the delay can be systematic and beyond the limit of the computing nodes' scope to handle. Hence, in company with incentive mechanisms, the straggling effect requires to be considered in the distributed computing management.

These challenges in distributed computing, mitigating the straggling effect and motivating the computing nodes, have been studied in many works. As aforementioned, many conventional technologies tackled the problems of stragglers with coding schemes to speed up distributed computing and selfish computing nodes with incentive mechanisms to encourage their participation. While these issues of distributed computing need to be jointly challenged at once for the best, the conventional technologies address them separately in two different problems. Accordingly, the present disclosure proposes a method that considers both coding schemes and incentive mechanisms for distributed computing.

FIG. 1 is an overall schematic view of a coding and Incentive-based distributed computing management system for distributed training of machine learning in IoT according to one embodiment of the present disclosure.

In the present disclosure, synchronous gradient descent computing with coding over a large number of heterogeneous EDs are considered, which have different hardware specifications and network conditions. The distributed gradient descent computation has been widely investigated as a fundamental operation for many optimization problems [19], [20], [21]. In distributed gradient descent computation, the gradients computed by multiple workers are aggregated, and parameters are updated to optimize the defined objective of a problem. However, the distributed synchronous gradient descent algorithms can be slow with the existence of stragglers since the system needs to wait for the slowest worker for the aggregation. Accordingly, in a proposed approach, the PS utilizes a coding scheme and allocates workloads on the EDs to mitigate the straggling effect in a distributed gradient descent computation task. The PS, further, offers an incentive to the EDs to encourage their participation by compensating the EDs' resource consumption caused by computation and communication.

In advance of the discussion on the system model and the problem formulation, the notations used in this disclosure will be explained briefly. The symbols frequently used in this disclosure are summarized in Table I.

vector is denoted as x–k. The ceiling function of a real number x is denoted as $\lceil x \rceil = \min\{z \in \mathbb{Z} \mid z \geq x\}$ and the floor function of x as $\lfloor x \rfloor = \max\{z \in \mathbb{Z} \mid z \leq x\}$.

A coding and Incentive-based (CoIn) distributed computing management system for distributed training of machine learning in IoT according to one embodiment of the present disclosure includes a parameter server (PS) 110, a plurality of end devices (EDs) 120, a base station 130, and a data shard (DS) 140.

Referring to FIG. 1, a proposed system model follows typical distributed computation and network models. Such a system includes a PS 110 publishing a gradient descent computation task to update the parameters for an optimization problem with a fixed amount of budget and N number of self-interested EDs 120 locally executing such computation in return for the incentive offered by the PS 110. While the PS 110 aims to aggregate the gradients computed by the EDs 120 with the shortest latency, the EDs 120 desire to maximize each own profit. The EDs 120 communicate with the PS 110 through their associated base stations (BSs) 130, where the EDs 120 communicate with their BSs 130 via wireless communication while the BSs 130 communicate with the PS 110 via wired communication. The data for processing is distributively stored in multiple data shards (DSs) (in other words, data storage) 140, and each ED 120 has an associated local DS. For an example, when a large image dataset is distributively stored in DSs 140, the PS 110 publishes a task on parameters update for an image classification problem. Any ED 120 that is nearby and accessible to one of the DSs 140 can participate in the published task

TABLE 1

| Symbol | Description |
| --- | --- |
| L | Amount of computation required to compute gradients of a single data block (bit) |
| $L_k$ | Amount of the workload assigned to the ED k in the distributed computing (bit) |
| σ | Data size of the processed moat (bit) |
| $\rho_k$ | Transmission power of the ED k (Watt) |
| $h_k$ | Channel gain between the ED k and its associated 13S (dB) |
| $N_k$ | Background white noise of the ED k @13) |
| $B_k$ | Bandwidth between the ED k and its associated BS (dB) |
| $r^u_k$ | Data uplink transmission rate from the ED k and its associated BS (bps) |
| $\mu_k$ | Straggling parameter between the PS and the BS associated with the ED k (I/second) |
| $f_k$ | CPU-cycle frequency of the ED k (cycle/second) |
| $c_k$ | Workload that the ED k can handle in a single CPU cycle (bits/cycle) |
| $K_k$ | Energy coefficient (effective switched capacitance) of the ED k (Watt.(second/cyde)') |
| $\eta_k$ | Conversion coefficient of energy consumption for the ED k (Dollar/Joule) |
| $T^{cp}_k$ | Delay for local computation execution of the ED k (second) |
| $T^{ix}_k$ | Delay for data transmission from the ED k to its associated BS (second) |
| $T^{ir}_k$ | Delay for data transferring from the BS associated with the ED k to the PS (second) |
| $\tau_k$ | Processing delay of the BS associated with the ED k (second) |
| $T_k$ | Task completion latency of the ED k (second) |
| $C^{cp}_k$ | Amount of energy consumed by the ED k for gradient computation (Joule) |
| $C^{ix}_k$ | Amount of energy consumed by the ED k for data transmission (Joule) |
| $C_k$ | Amount of energy consumed by the ED k to complete the task (Joule) |
| R | Amount of incentive offered to EDs by the PS (Dollar) |
| $R^b$ | Base incentive to be distributed to EDs (Dollar) |
| $R^c$ | Competition incentive to be distributed to EDs (Dollar) |
| ε | Minimum amount of profit guaranteed to each ED by the PS for participation (Dollar) |
| δ | Degree of the value degradation of a temporal discount rate factor (l/second) |
| $\gamma_k$ | Evaluated value for the works of the ED k |
| N | Number of EDs participating in the distributed computing |
| M | Number of homogeneous ED groups |
| $n_k$ | Number of EDs in the k-th group |
| $s_k$ | Number of the stragglers in the k-th ED group |
| $s_k$ | Number of the non-stragglers in the k-th ED group |

The set of all positive real numbers is denoted as $\mathbb{R}^+$. In the present disclosure, $\Pi_{k=1}^n \mathcal{A}_k = \mathcal{A}_1 \times \mathcal{A}_2 \times \ldots \times \mathcal{A}_n$, $\mathcal{A} \setminus \mathcal{B} = \{x \in \mathcal{A} \mid x \notin \mathcal{B}\}$, and $[k] = \{1, 2, \ldots, k\}$ are denoted for $k \in \mathbb{N}$. The k-th element in a vector $x = (x_1, x_2, \ldots, x_n)$ with $n \geq k$ is denoted as $x_k$. With the k-th element excluded, the for parameter updates to earn profits by retrieving a set of image data samples, computing the gradients, and sending the processed results to the PS 110.

Figure 2:
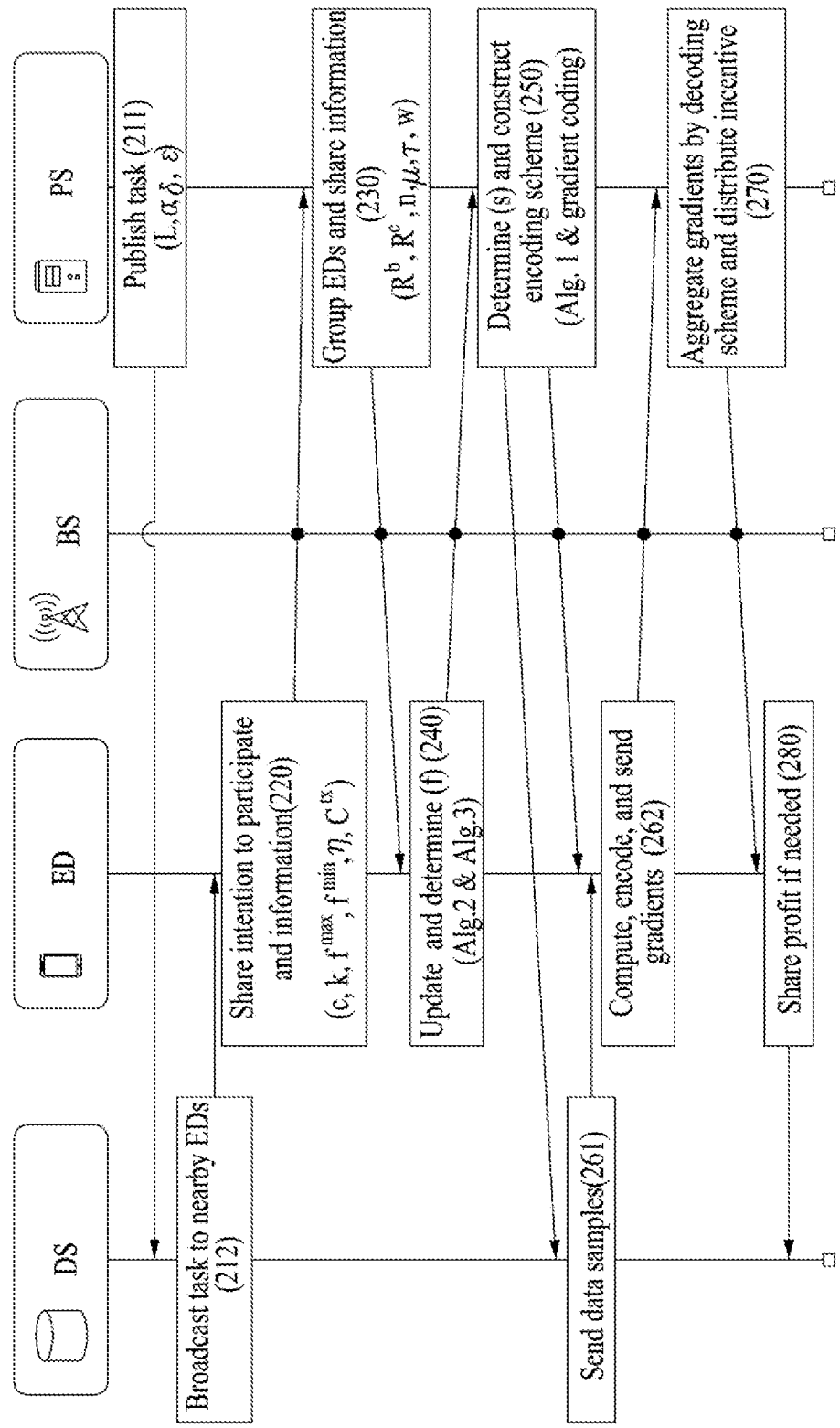
FIG. 2 is a flowchart of a coding and Incentive-based distributed computing management method for distributed training of machine learning in IoT according to one embodiment of the present disclosure.

FIG. 2 is a flowchart of a coding and Incentive-based distributed computing management method for distributed training of machine learning in IoT according to one embodiment of the present disclosure.

The coding and Incentive-based distributed computing management method for distributed training of machine learning in IoT according to one embodiment of the present disclosure includes: the step in which a parameter server (PS) publishes a gradient descent computation task to update parameters of distributed computing and sends the published task to a plurality of end devices; the step in which the plurality of end devices (EDs) receive the published task from the parameter server and send an intention to participate in the published task and related information to the parameter server; the step in which the parameter server groups the plurality of end devices into clusters by receiving the intention to participate and related information from the plurality of end devices; the step in which the plurality of end devices determine CPU-cycle frequencies by receiving information on the grouping of the plurality of end devices and related information from the parameter server; the step in which the parameter server determines the number of stragglers in each cluster based on the determined CPU-cycle frequencies and sends the determined number of stragglers to the plurality of end devices, along with an encoding scheme for gradient descent computation; the step in which the plurality of end devices perform encoding for gradient descent computation and send a computed gradient to the parameter server; and the step in which the parameter server distributes incentive to the plurality of end devices based on encoded results.

The sequence diagram provided in FIG. 2 shows the communication and data flows of the proposed distributed computing mechanisms, where the parameters to update are denoted as W. For the first step of the proposed distributed computing management method, the PS publishes (211) a task, which is broadcast (212) by the DS to their nearby EDs. The EDs that desire to participate in the published task share (220) their intention to participate and information by sending the information on their hardware specifications and preferences to the PS. By analyzing the information sent from the EDs and network conditions, the PS groups (230) the EDs into homogeneous worker clusters, in which the workers have identical hardware specifications and preferences. Then, the PS broadcasts (230) the basic information required for the decision-making process to all participating EDs, including the up-to-date parameters for the published gradient descent computation task. The EDs update (240) their CPU-cycle frequencies (f) according to Algorithm 2 (see FIG. 9(c)) by communicating with the PS until an equilibrium is reached. Based on the determined CPU-cycle frequencies of the EDs, the PS determines the number (s) of the stragglers in each cluster according to Algorithm 1 (see FIG. 9(a)) and constructs (250) an encoding scheme with gradient coding [19]. The DS send (261) data samples to the EDs. When the EDs receive the data samples from the DS, they compute, encode, and send (262) the results to the PS. The PS decodes and aggregates (270) the results when a sufficient number of the processed results arrive from the EDs. The incentive is distributed (270) based on an evaluation criterion when the PS receives the results from all EDs. If needed, the profit that the EDs earn can be shared (280) with the DS. The total amount of the incentive offered by the PS is assumed to be enough to cover all participating EDs in the sequence diagram. However, when the PS's budget is insufficient, the PS can easily eliminate the worker cluster requiring the largest amount of incentive $r^{max}$, one at a time until the PS's budget is enough to cover all remaining EDs that desire to participate in the distributed computing. The coding and Incentive-based distributed computing management method for distributed training of machine learning in IoT according to one embodiment of the present disclosure will be described in more details with reference to FIGS. 3 to 9.

Figure 3:
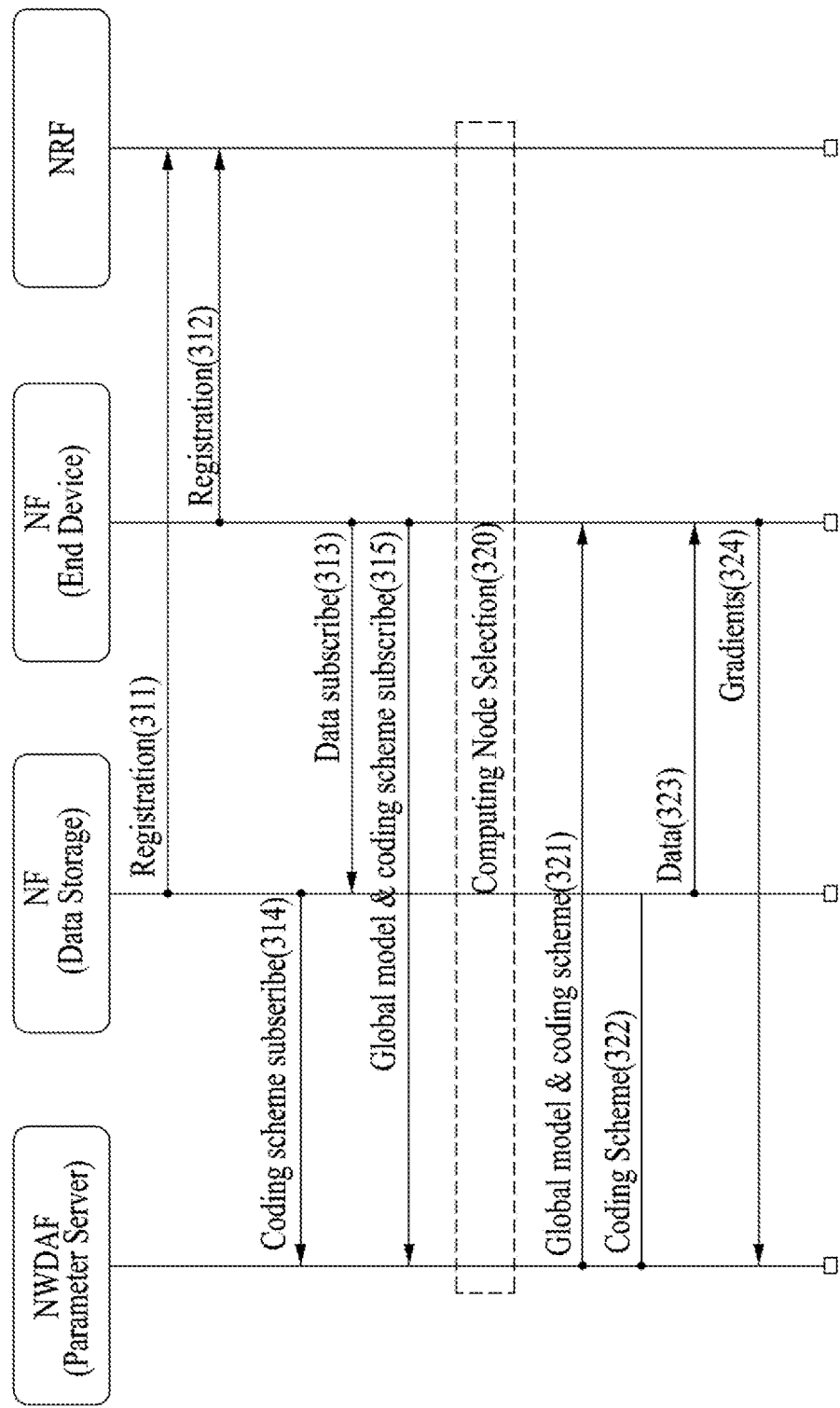
FIG. 3 is a flowchart describing an integration of the proposed distributed computing mechanisms in 3GPP 5G architecture.

FIG. 3 is a flowchart describing an integration of the proposed distributed computing mechanisms in 3GPP 5G architecture.

To deploy the proposed mechanisms in practice, the proposed mechanisms require to be seamlessly integrated into the network architecture. Accordingly, the proposed distributed computing mechanisms are integrated into the architecture of 3GPP 5G service, which is illustrated in FIG. 3. The 3GPP defined a new framework for core network for 5G called service-based architecture (SBA), which is delivered by a set of network functions (NFs) with authorization to access each other's services. In SBA, NFs expose services through RESTful application program interfaces (APIs), and NFs can invoke services in other NFs via these APIs (313). Hence, service producers must register with an NF repository function (NRF) to be discoverable to service consumers (311 and 312). Upon request from an NF, the NRF responds with a list of identifiers for service producers. In addition, network data analytics function (NWDAF) collects data (314 and 315) and processes data to provide predictions to other NFs with analytics and prediction exposure procedures (321 and 322). In the proposed distributed computing mechanisms, the end devices provide the computing resources to the parameter server as service (324), thus they become the service producers. Hence, to participate in the distributed computing, the end devices require to register to NRF as NFs. The data storages provide data to end devices as well (323), and the data storages also need to register to NRF as NFs. Meanwhile, the parameter server is the service consumer in the distributed computing. As the parameter server acts as the function that manages data collections, analytics, and predictions, the parameter server becomes NWDAF in SBA. In SBA, distributed computing is initiated by the parameter server requesting the information for the data storages that contain appropriate data for model updates. The data storages with data can subscribe to the parameter server and request the information for end devices that desire to participate in the distributed computing. The end devices subscribe to the data storages for data and to the parameter server for the up-to-date global model and the coding scheme. A node selection process is executed if necessary as described in feasibility analysis (320).

Figure 4:
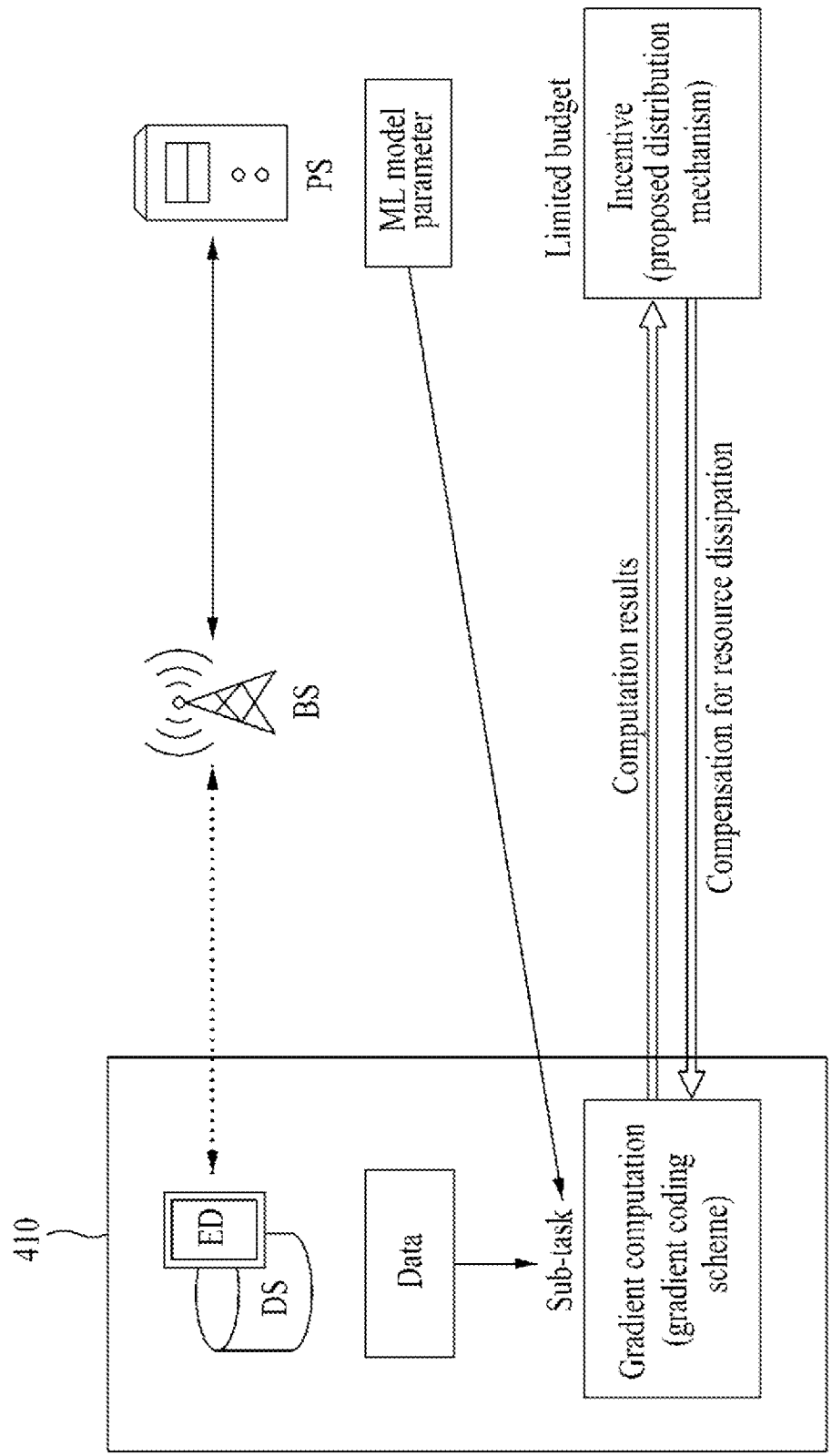
FIG. 4 is a view describing a distributed training process using an IoT device according to one embodiment of the present disclosure.

FIG. 4 is a view describing a distributed training process using an IoT device according to one embodiment of the present disclosure.

In the distributed gradient descent computation according to the embodiment of the present disclosure, the EDs with the same hardware specifications and network conditions choose (410) an identical action plan to optimize their profit even when they are not cooperative but self-interested. Accordingly, the PS logically forms worker clusters to apply gradient coding, each of which consists of the EDs associated to a same DS and BS with identical hardware specifications and network conditions. That is, the EDs in different clusters are heterogeneous while the EDs in the same cluster are homogeneous in their hardware specifications and network conditions.

Figure 5:
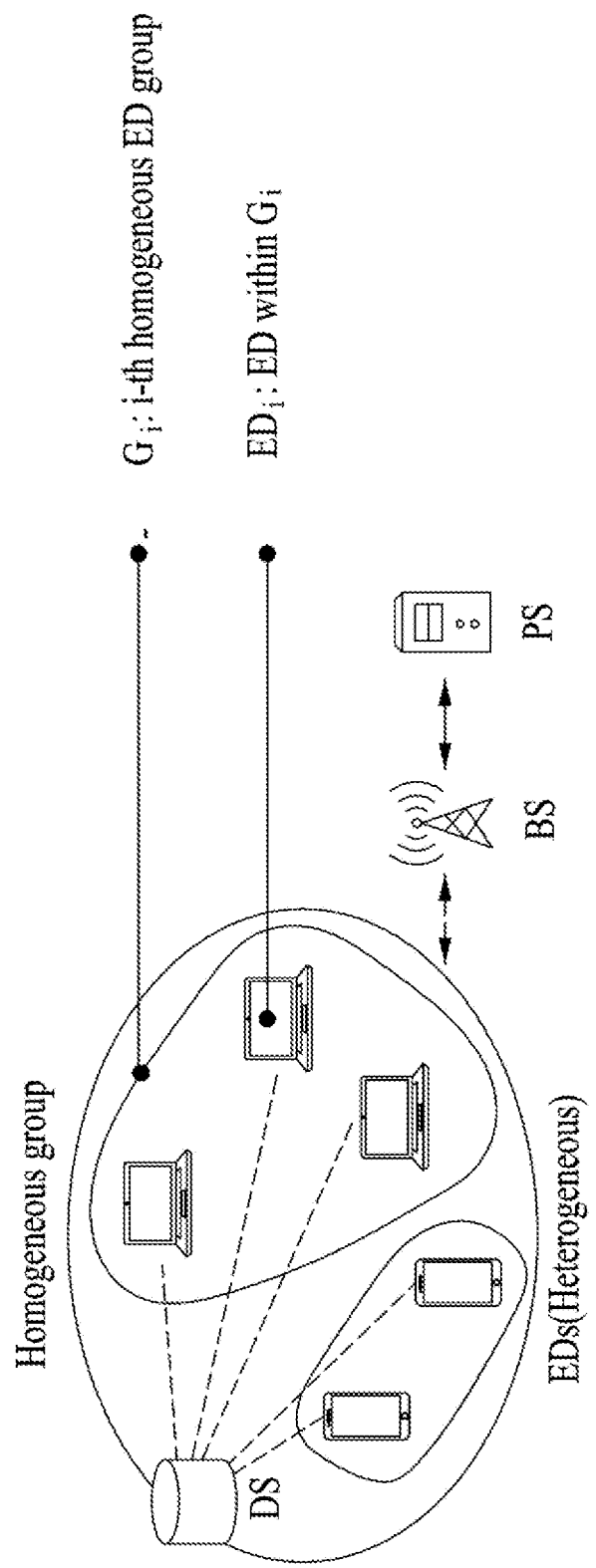
FIG. 5 is a view describing a computation process in end devices according to one embodiment of the present disclosure.

FIG. 5 is a view describing a computation process in end devices according to one embodiment of the present disclosure.

When there are m number of clusters, we denote the i-th cluster (i.e., group) as $G_i$ and the number of EDs in $G_i$ as $n_i$.

The notation $ED_{i,j}$ is used to indicate the j-th ED assigned to $G_i$ and $ED_i$. The DS and BS associated with $ED_i$ are notated as $DS_i$ and $BS_i$, respectively. In the present disclosure, a quasi-static scenario is considered as in other conventional technologies, where the participating EDs and the parameters may vary over time but remain unchanged from the point of task initiation to completion.

As for workload, the workloads on EDs are determined by the gradient coding scheme proposed in the conventional technology [19]. When a single data block that consists of multiple data samples requires L bits of computation for a gradient descent computation task, the workload of the data block for the given task is defined as L and the data size of the processed result as a. Initially, a nonidentical data block is assigned to each computing node. With gradient coding, the workload may increase depending on the number of stragglers while the size of the processed result remains unchanged. Gradient coding constructs a set of decoding and encoding schemes (A, B) in a way that the sum of the gradients computed by different computing nodes can be aggregated with a subset of the processed results. When there exist s stragglers in n computing nodes with s<n, gradient coding constructs a decoding scheme, A, that aggregates the gradients from (n−s) computing nodes and an encoding scheme, B, that specifies the load assignments for n computing nodes. Gradient coding scheme introduces redundant s data blocks to each computing nodes, which leads to the additional sL workload on each node.

That is, the PS applies gradient coding to each cluster by leveraging redundant data blocks to process, and the workloads on the EDs in a cluster are determined by the number of stragglers in the cluster. The numbers of stragglers and non-stragglers in $G_i$ are denoted as $s_i$ and $\tilde{s}_i$ respectively, where $s_i$ and $\tilde{s}_i$ are positive real numbers and $n_i = s_i + \tilde{s}_i$. When each $ED_i$ is initially assigned with a nonidentical data block with size L, gradient coding deliberately assigns $s_i$ additional data blocks to each $ED_i$. Hence, the workload on each $ED_i$, denoted as $L_i$, becomes as follows:

$$L_i = L(s_i + 1) \quad (1)$$

As for processing delay and cost of an ED, the EDs utilize the dynamic voltage scaling (DVS) technique, which allows EDs to adaptively control the computing speed and energy consumption by scheduling the CPU-cycle frequency.

Let $f_i$ and $c_i$ be the $ED_i$'s CPU-cycle frequency and the size of workload that can be handled in a single CPU-cycle, respectively. The local computation execution delay of the $ED_i$ and the corresponding energy consumption, denoted as $T_i^{cp}$ and $C_i^{cp}$ can be respectively given by $$T_i^{cp} = \frac{L_i}{c_i f_i}, \quad (2)$$

and $$C_i^{cp} = \kappa_i \frac{L_i}{c_i} f_i^2, \quad (3)$$

where $k_i$ represents the effective capacitance of the $ED_i$, which is determined by the chip architecture.

As for transmission delay and cost of an ED, the wireless uplink data transmission is designed with Shannon capacity. The uplink data rate from $G_i$ to the $BS_i$ is denoted as $r_i^u$, which is given by $$r_i^u = B_i \log\left(1 + \frac{\rho_i h_i}{N_i}\right), \quad (4)$$

where $N_i$ is the background noise power, $h_i$ is the channel gain, $B_i$ is the channel bandwidth between the $ED_i$ and the $BS_i$, and $\rho_i$ is the transmission power of the $ED_i$, which is determined by the $BS_i$ according to a power control algorithm. The data size to be transmitted is the data size of the processed result a, and the EDT's transmission delay and energy consumption are given by, respectively, $$T_i^{tx} = \frac{\sigma}{r_i^u}, \quad (5)$$

and $$C_i^{tx} = \rho_i T_i^{tx}. \quad (6)$$

The one-way network delay for data transfer from the $BS_i$ to the PS is denoted as $T_i^{tr}$, which is a random variable following a shifted-exponential distribution. Accordingly, the data transfer delay $T_i^n$ is a random variable following a shifted-exponential distribution, such that $$g_{T_i^{tr}}(t) = \begin{cases} \mu_i e^{-\mu_i(t-\tau_i)} & \text{if } t \geq \tau_i, \\ 0 & \text{otherwise}, \end{cases} \quad (7)$$

where $\mu_i$ is the straggling parameter, and $\tau_i$ is the processing delay of the $BS_i$. The cumulative distribution and the expected value of $T_i^n$ are respectively given by $$Pr(T_i^{tr} \leq t) \begin{cases} 1 - e^{-\mu_i(t-\tau_i)} & \text{if } t \geq \tau_i, \\ 0 & \text{otherwise}, \end{cases} \quad (8)$$

and $$E[T_i^{tr}] = \frac{1}{\mu_i} + \tau_i. \quad (9)$$

In the present disclosure, we consider that the bandwidth and the transmission power of an ED are determined to satisfy the ED's wireless network requirements, and the joint consideration of the CPU-cycle frequency, channel bandwidth, and transmission power controls is left for the future work, due to the complexity of the problem. The incentive mechanisms proposed in the present disclosure consider the cost incurred in transmission for incentive distribution. Furthermore, the incentive mechanisms guarantee the minimum amount of incentives to all participating EDs, which possibly compensate the additional costs including the bandwidth costs.

The network conditions $\mu_i$ and $\tau_i$ are assumed to be known from historical data or empirical formula.

As for task completion latency of a cluster, with the non-deterministic delay introduced by the data transfer from BSs to the PS, the task completion latency of a cluster $G_i$, denoted as $T_i$, is a random variable following a shifted-exponential distribution, such that $$g_{T_i}(t) = \begin{cases} \mu_i e^{-\mu_i[t-(T_i^{cp}+T_i^{tx}+\tau_i)]} & \text{if } t \geq T_i^{cp} + T_i^{tx} + \tau_i, \\ 0 & \text{otherwise.} \end{cases} \quad (10)$$

The cumulative distribution and the expected value of $T_i$ are respectively given by $$Pr(T_i \leq t) = \begin{cases} 1 - e^{-\mu_i[t-(T_i^{cp}+T_i^{tx}+\tau_i)]} & \text{if } t \geq T_i^{cp} + T_i^{tx} + \tau_i, \\ 0 & \text{otherwise,} \end{cases} \quad (11)$$

and $$E[T_i] = \frac{1}{\mu_i} + T_i^{cp} + T_i^{tx} + \tau_i. \quad (12)$$

With gradient coding, the cluster $G_i$ is robust to $s_i$ stragglers, which allows the PS to successfully aggregate the results of all $ED_i$ with any $\tilde{s}_i$ processed results. Therefore, the task completion latency of the $ED_i$ is when $\tilde{s}_i$-th data from $G_i$ arrives at the PS. This follows the $\tilde{s}_i$-th order statistic of the identical random variables that follow the shifted-exponential distribution given in (10). The $\tilde{s}_i$-th order statistic of $G_i$ is denoted as $T_{\tilde{s}_i:n_i}$, and its expected value is given by $$E[T_{\tilde{s}_i:n_i}] = \frac{1}{\mu_i} \log\left(\frac{n_i}{s_i}\right) + \frac{L(s_i+1)}{c_i f_i} + T_i^{tx} + \tau_i. \quad (13)$$

Here, the difference of two harmonic sums is approximated with the subtraction of natural logarithms, such that $H_{n_i} - H_{s_i} \approx \log(n_i) - \log(s_i)$, where $$H_q = \sum_{k=1}^{q} \frac{1}{k}.$$

Figure 6:
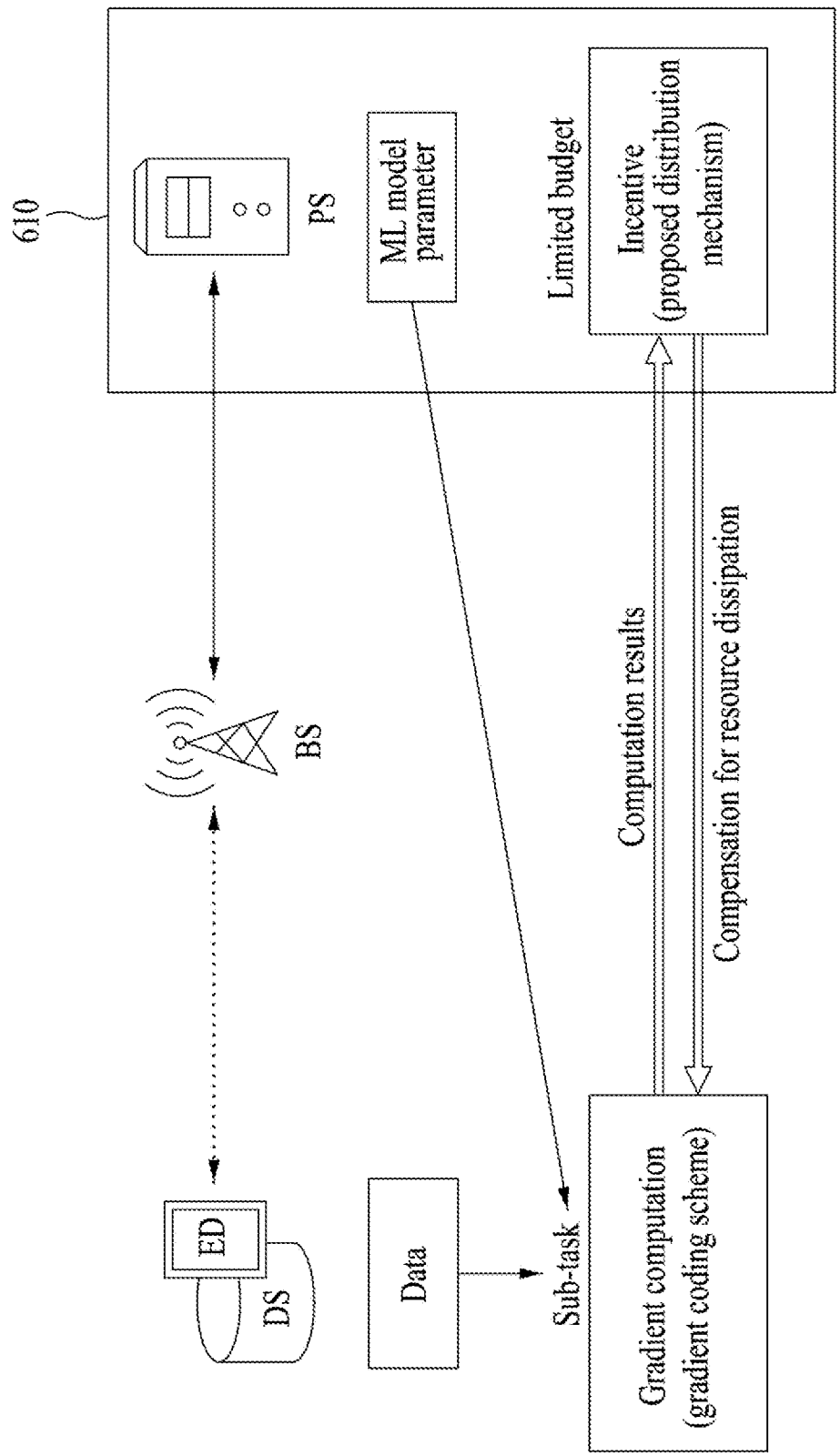
FIG. 6 is a view describing an incentive distribution process by a parameter server according to one embodiment of the present disclosure.

FIG. 6 is a view describing an incentive distribution process by a parameter server according to one embodiment of the present disclosure.

When the PS incentivizes EDs, the higher the incentive, the more EDs are willing to actively involve in the task, and thus the PS offers the maximum of its budget to minimize the latency (610).

Figure 7:
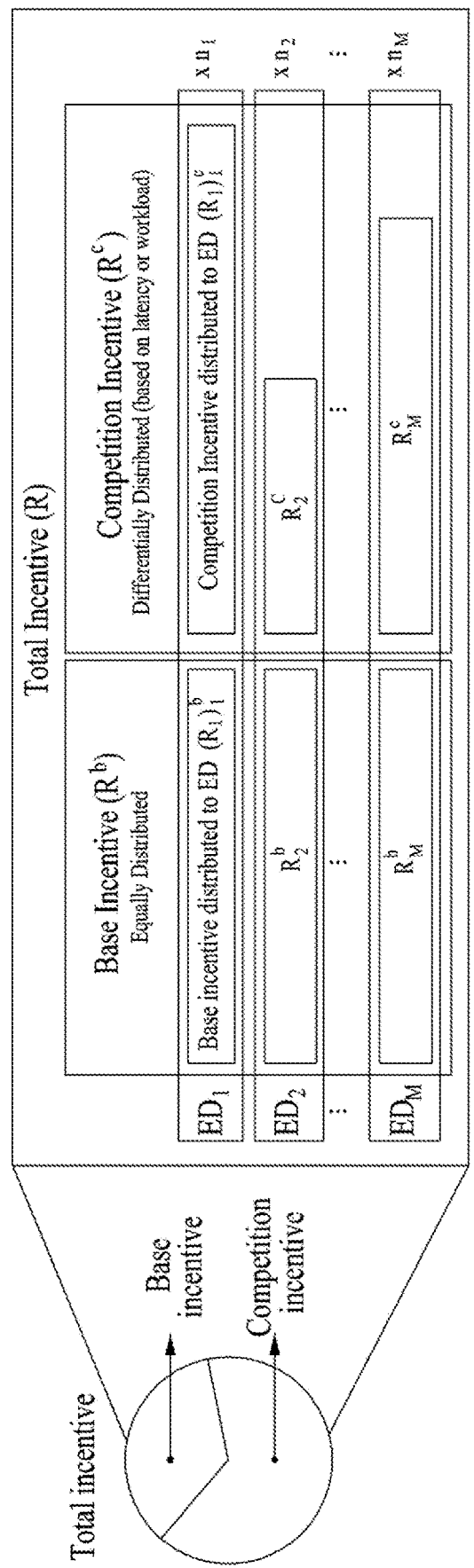
FIG. 7 is a view describing base and competition incentive distribution processes according to one embodiment of the present disclosure.

FIG. 7 is a view describing base and competition incentive distribution processes according to one embodiment of the present disclosure.

When the amount of incentive offered by the PS to EDs is fixed as R, the PS separates R into two types of incentive, i.e., base and competition, to encourage the participation by guaranteeing minimum incentive to EDs. The base incentive, denoted as $R^b$, is equally distributed to all participating EDs to prevent the EDs' profit from becoming less than a predetermined minimum value. Correspondingly, the amount of incentive that each $ED_i$ is guaranteed to receive from the base incentive for its participation is denoted as $R_i^b$, given by $$R_i^b = \frac{R^b}{\sum_{i'=1}^{M} n_{i'}}. \quad (14)$$

Since R is the sum of the base and competition incentives, the amount of incentive offered by the PS is greater than $R^b$, which is computed from the conditions of EDs. The competition incentive, denoted as $R^c$, is for encouraging EDs to actively engage in the given task to reduce task completion latency by inducing the EDs to compete for the incentive.

The PS distributes the competition incentive proportional to the evaluated values of the tasks processed by the EDs. In the present disclosure, incentive distribution mechanisms with two different evaluation criteria are considered, workload (WL) and completion time (CT). For WL-based incentive distribution, the task completed by an ED is evaluated with the amount of workload that the ED processed. Considering the workload in incentivizing, the workload and resource shared by the ED are taken account of. For CT-based incentive distribution, the worth of the ED's task is evaluated with its expected task completion latency. The completion time represents the quality of the ED's task to the PS. The evaluated value of each EDT's task is denoted as $\gamma_i$, and the incentive that each $ED_i$ gains from $R^c$ is denoted $R_i^c$, which is given by $$R_i^c = R^c \frac{\gamma_i}{\sum_{i'=1}^{M} n_{i'} \gamma_{i'}}. \quad (15)$$

Figure 8:
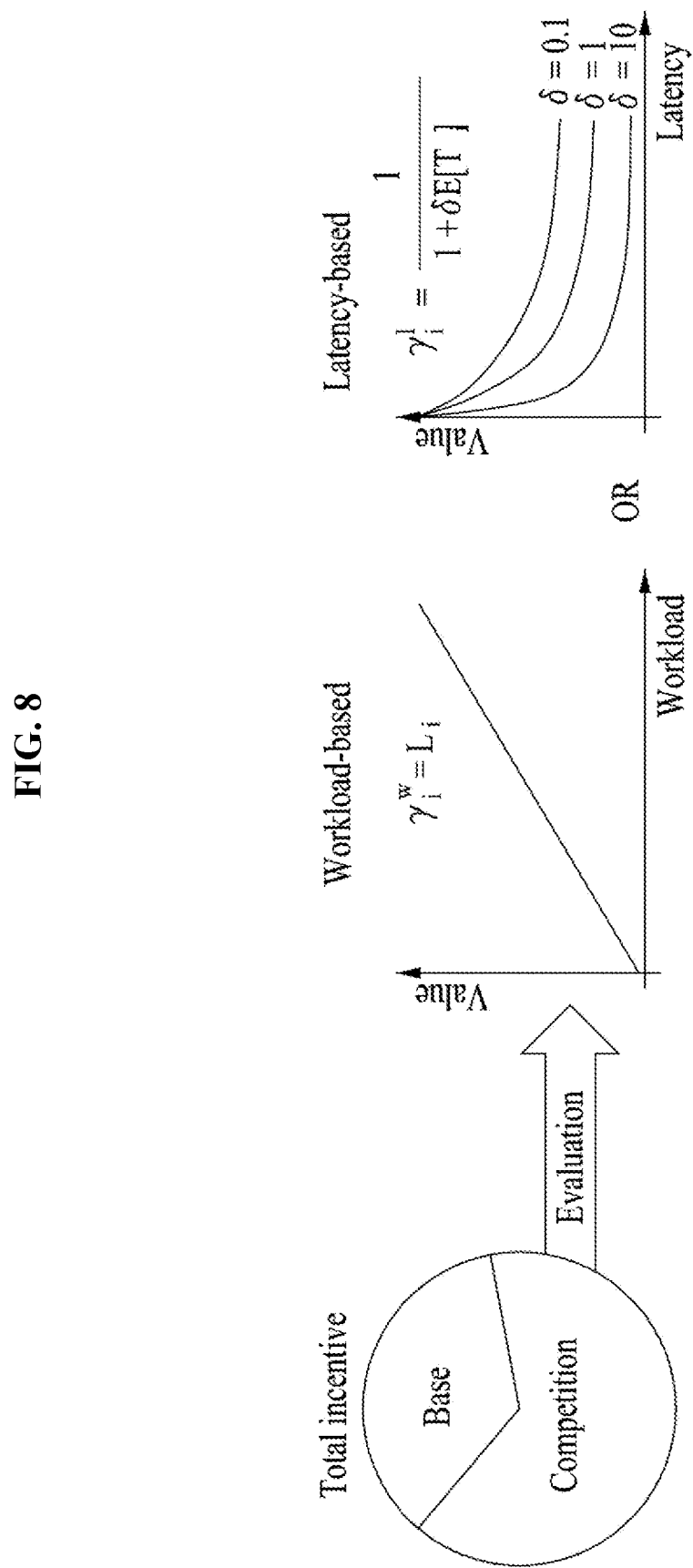
FIG. 8 is a view describing a performance evaluation of an end device according to one embodiment of the present disclosure.

FIG. 8 is a view describing a performance evaluation of an end device according to one embodiment of the present disclosure.

Here, the evaluated value of each $ED_i$'s task is defined as follows:

$$\gamma_i = \begin{cases} \gamma_i^{wl} & \text{with WL-based distribution} \\ \gamma_i^{ct} & \text{with CT-based distribution} \\ 1 & \text{with uniform distribution} \end{cases} \quad (16)$$

where $\gamma_i^{wl} = L_i$ (17), and $$\gamma_i^{ct} = \frac{1}{1 + \delta E[T_i]}. \quad (18)$$

The value of each EDT's task evaluated with CT-based distribution in (18) is also known as a hyperbolic discount factor, which represents the value degrading in time. The rate factor $\delta$ indicates the degree of the value degradation and depends on the time-sensitive characteristic of a task.

Figure 9:
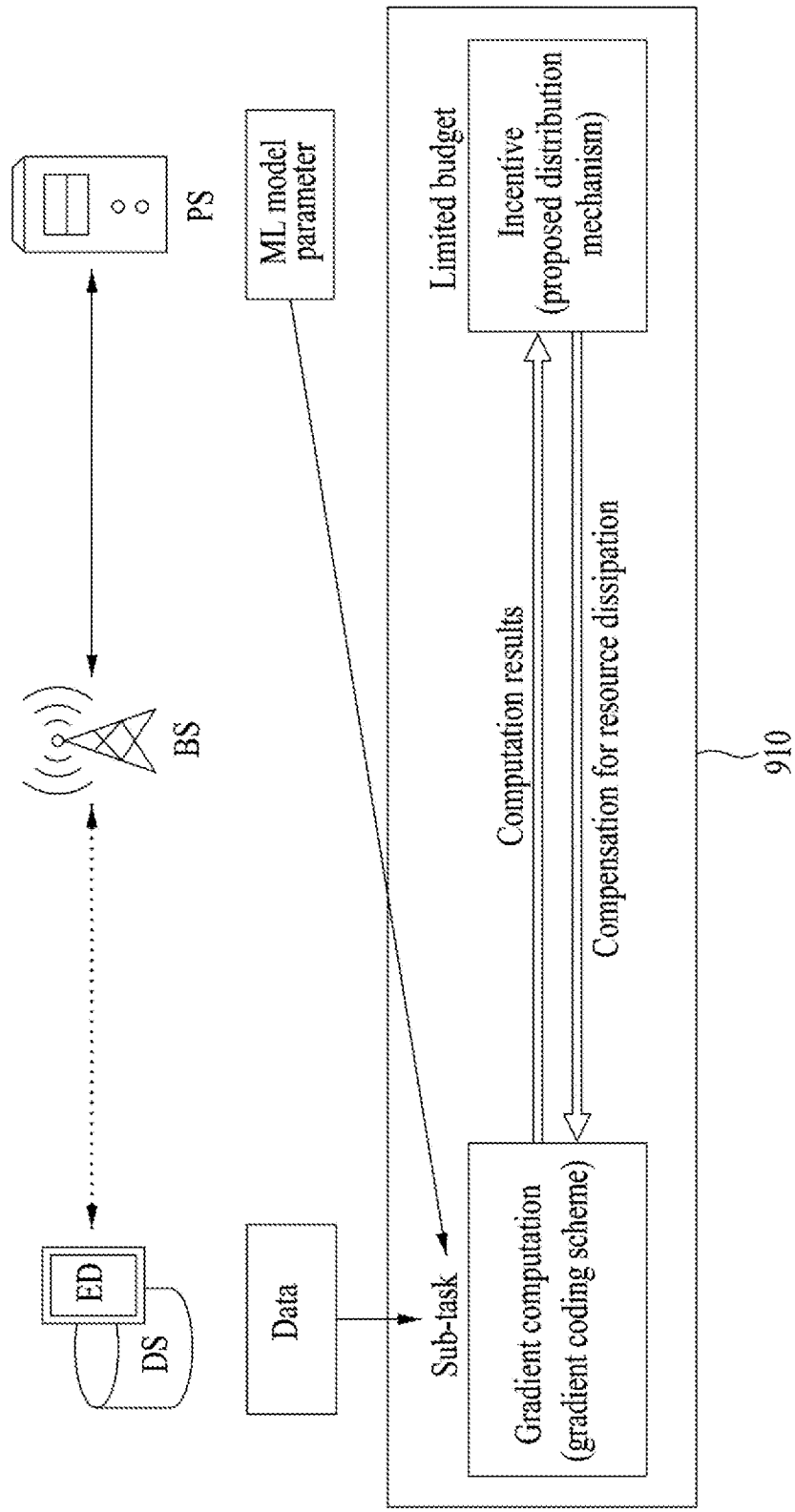
FIG. 9 is a view describing a problem formulation process according to one embodiment of the present disclosure.

FIG. 9 is a view describing a problem formulation process according to one embodiment of the present disclosure.

The EDs aim to maximize their profits through the competition among each other to earn the incentive by controlling the CPU-cycle frequency with DVS technique (910). The utility of each ED is defined as its profit, which is the amount of incentive that it earns subtracted by the weighted energy consumption. The incentive gain and the energy consumption of each $ED_i$ are respectively denoted as $R_i$ and $C_i$, given by $$R_i = R_i^b + R_i^c, \quad (19)$$

and $$C_i = C_i^{cp} + C_i^{tx} \quad (20)$$

Accordingly, the utility function of each $ED_i$ is defined as $\tilde{\Psi}_i: \tilde{\mathcal{F}}_i \to \mathcal{R}$, which is given by $$\tilde{\Psi}_i(f_i; f_{-i}) = R_i - \eta_i C_i \quad (21)$$

$$= \left( \frac{R^b}{\sum_{i'=1}^{M} n_{i'}} + \frac{R^c \gamma_i}{\sum_{i'=1}^{M} n_{i'} \gamma_{i'}} \right) - \eta_i \left( \kappa_i \frac{L_i}{c_i} f_i^2 + \rho_i \frac{\sigma}{r_i^{tx}} \right). \quad (22)$$

Here, $\eta_i$ denotes a weight parameter of energy consumption, which converts the amount of the energy consumption into a term of monetary costs (e.g. dollar, euro, or other units for incentive). The $ED_i$'s utility function with is denoted as $\tilde{\Psi}_i^{wl}(f_i; f_{-i})$ and with $\gamma_i^{cl}$ as $\tilde{\Psi}_i^{ct}(f_i; f_{-i})$. The domain for $f_i$ is defined as $\tilde{\mathcal{F}}_i = \{f \in \mathbb{R}^+ | f_i^{lb} \le f \le f_i^{ub}\}$. Here, $f_i^{lb}$ and $f_i^{ub}$ are respectively the lower and upper bounds of feasible CPU-cycle frequency of $ED_i$. Meanwhile, the minimum and maximum of the feasible hardware specifications on the $ED_i$'s frequency are respectively denoted as $f_i^{min}$ and $f_i^{max}$. The lower and upper bounds of EDT's strategy domain are determined by not only the hardware specifications but also other parameters, including the amount of incentive offered by the PS.

The PS desires to minimize the latency of the distributed gradient descent computation. The PS needs any $\tilde{s}_i$ processed results from $ED_i$ to aggregate the results of $G_i$. Therefore, the expected latency for $G_i$ to complete the task is when $\tilde{s}_i$-th data from $G_i$ arrives at the PS, which is denoted as $E[T_{\tilde{s}_i:n_i}]$ in (13). Accordingly, the expected latency of $G_i$ is defined as a function of $s_i$, such that $\Phi_i: \mathcal{S}_i \to \mathbb{R}$, given by $$\Phi_i(s_i; f_i) = \frac{1}{\mu_i} \log\left(\frac{n_i}{s_i}\right) + \frac{L(s_i+1)}{c_i f_i} + T_i^{tx} + \tau_i. \quad (23)$$

The domain for $s_i$ is defined as $\mathcal{S}_i = [n_i - 1]$. The number of stragglers physically cannot exceed the total number of EDs in the cluster. In addition, if the number of stragglers is equal to the total number of EDs, it is impractical to mitigate the straggling effect of the cluster. Moreover, the stragglers in the distributed computing cannot be completely removed. Hence, in this problem, the present disclosure considers the cases when each cluster has at least one straggler, and the number of the stragglers is less than the total number of EDs in the clusters, such that $1 \le s_i \le (n_{i-1})$ for all i in [M]. To reduce the latency for the task completion of all ED clusters, the PS aims to minimize the latency of the cluster with the longest latency. Accordingly, the cost function of the PS is given by $$\max_{i \in [M]} \{\Phi_i(s_i; f_i)\}. \quad (24)$$

FIG. 10a to FIG. 10e are views describing a coding and Incentive-based distributed computing management algorithm according to one embodiment of the present disclosure.

The distributed gradient descent computation in the present disclosure is a hierarchical decision-making problem among non-cooperative EDs and a PS, in which the EDs and the PS respectively aim to maximize the profits and minimize the task completion latency. Such hierarchical competition can be analyzed as a Stackelberg game, which is a non-cooperative strategic game between two types of players with hierarchy, leaders and followers.

Figure 10A:
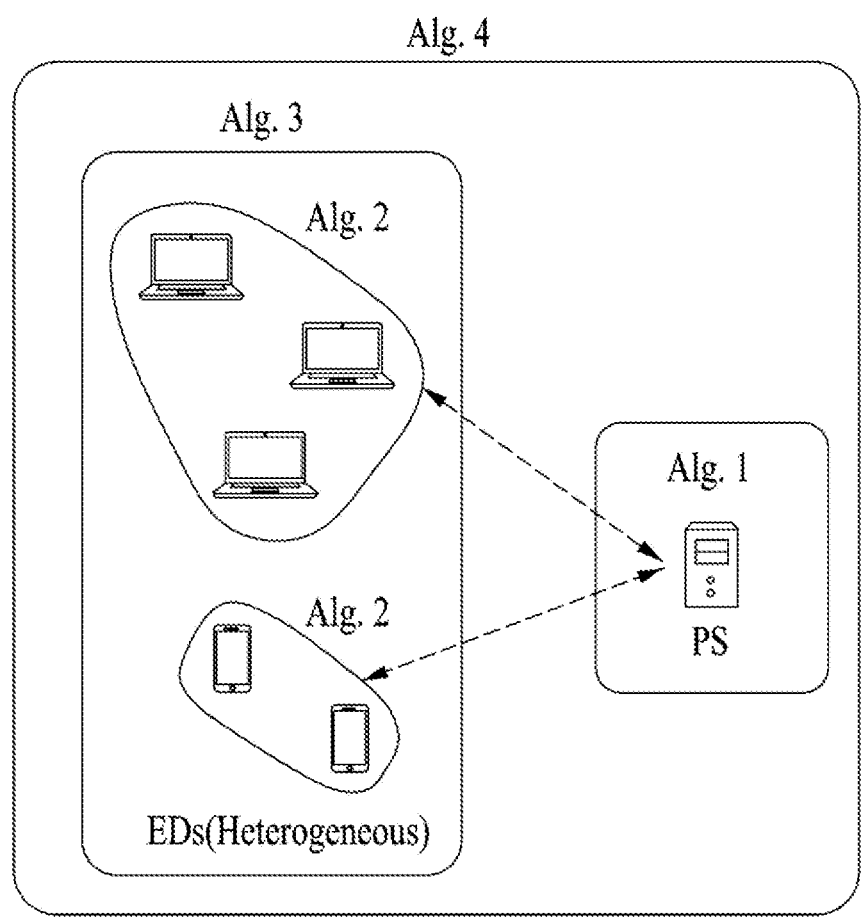

FIG. 10a schematically illustrates an algorithm applied to each component of a coding and Incentive-based distributed computing management algorithm according to one embodiment of the present disclosure.

In the proposed mechanism, the EDs act as sellers or providers of their computational resources while the PS acts as a buyer or a user of the computation provided by the EDs. Accordingly, the present disclosure formulates a distributed computing (DC) Stackelberg game where a PS follows the behavior of the EDs. The DSs and BSs in the system model are not the players of the Stackelberg game, but their roles are respectively providing the data to EDs for the gradient descent computation and relaying the processed results from EDs to the PS. The EDs and PS interact to optimize their objective functions by determining strategies in responses to the other players' strategies. As multiple leaders of the game, the EDs take the first move by determining the CPU-cycle frequencies to non-cooperatively maximize each own profit. The EDs are aware that the PS will follow their actions and allocates task load according to their chosen frequencies. Therefore, the EDs determine their frequencies considering the response of the PS. The EDs compete with one another to earn more incentive, which forms a profit maximization (PM) subgame among the EDs. With the best responses of the EDs determined in the PM subgame, the PS allocates workload to the EDs to minimize the task completion latency as a single follower. The information on the EDs and the PS required for determining strategies is considered to be shared in advance of the decision-making process (e.g., $c_i$, $f_i^{min}$, $f_i^{max}$, $T_i^{tx}$, $C_i^{tx}$, $\eta_i$, $R^b$, $R^c$, $\epsilon$) as described in FIG. 2.

The solution of the Stackelberg game, also known as Stackelberg equilibrium (SE), is obtained with backward induction, an algorithm that computes equilibria of a game with a process of reasoning backward in the order of players' action-takings. Hence, with backward induction, the analysis of the strategical behavior of the PS is preceded, followed by the analysis of the EDs.

While the Stackelberg game between the EDs and the PS is analyzed with backward induction, the PM subgame among the EDs is analyzed with best-response dynamics, which is a class of strategy updating rules where the strategies of a subset of players are determined as their best responses to the other players by turns. The SE of the DC Stackelberg game obtained with the algorithms becomes a unique Nash equilibrium (NE) of the game indicating that none of the players can benefit by unilaterally deviating from its current strategy.

An analysis of the PS's side of the Stackelberg game, which is a follower, according to one embodiment of the present disclosure will be described.

To minimize the task completion latency, the PS determines the best load allocation by determining the optimal numbers of stragglers in each cluster, such that $$s^* = \underset{s \in \mathcal{S}}{\operatorname{argmin}} \left\{ \max_{i \in [M]} \{\Phi_i(s_i; f_i)\} \right\}, \quad (25)$$

where the strategy of the PS is given as $s = (s_1, s_2, \ldots s_M)$, and the domain of the PS's strategy is denoted as $\mathcal{S} = \Pi_{i \in M} \mathcal{S}_i$.

To analyze the strategical behavior of the PS, its objective function is redefined on a continuous real valued domain, $\mathscr{S}_i = \{s_i \in \mathbb{R}_+ | 1 \leq s_i \leq n_i - 1\}$. The optimization problem of the PS is, then, reformulated in a Lagrange dual problem.

The redefined real valued function is denoted as $\tilde{\Phi}_i: \mathscr{S}_i \to \mathbb{R}^+$ such that $$\Phi_i(s_i; f_i) = \tilde{\Phi}_i(s_i; f_i), \forall s_i \in \mathscr{S}_i. \quad (26)$$

The domain of the PS's strategy with $\tilde{\Phi}_i(s_i; f_i)$ is defined as $\mathscr{S} = \Pi_{i \in M} \mathscr{S}_i$. With the transformation to an epigraph representation, the Lagrangian of the original problem is defined as $\mathscr{L}: \mathscr{S} \times \Lambda \to \mathbb{R}$, such that $$\mathcal{L}(s, \lambda; f) = \sum_{i=1}^{M} \lambda_i \tilde{\Phi}_i(s_i; f_i), \quad (27)$$

where the domain of the Lagrangian multiplier vector $\lambda = (\lambda_1, \lambda_2, \ldots, \lambda_M)$ is given by $$\Lambda = \left\{ \lambda \in \mathbb{R}^M \,\middle|\, \sum_{i=1}^{M} \lambda_i = 1 \wedge (\lambda_i \geq 0, \text{ for all } i \in [M]) \right\}$$

The Lagrange dual problem with the defined Lagrangian is given by $$\underset{\lambda}{\text{maximize}} \left\{ \underset{s \in \mathscr{S}}{\text{minimize}} \{\mathcal{L}(s, \lambda; f)\} \right\}. \quad (28)$$

The range of $\tilde{\Phi}_i(s_i; f_i)$ is positive real numbers, and the elements of s are independent to one another. Consequently, the Lagrange dual problem in (28) is equivalent to $$\underset{\lambda}{\text{maximize}} \left\{ \sum_{i=1}^{M} \lambda_i \left( \underset{s \in \mathscr{S}}{\min} \{\tilde{\Phi}_i(s_i; f_i)\} \right) \right\}. \quad (29)$$

The objective function of the PS in the primal problem, $\max_{i \in [M]} \{\tilde{\Phi}_i(s_i; f_i)\}$, is a convex function. As the primal problem is convex and strictly feasible, the strong duality between the primal and the dual problems is guaranteed. Hence, the optimums of the dual and primal problems become equivalent. Once the best response of the PS, $s^* = (s_1^*, s_2^*, \ldots, s_M^*)$, is obtained, the Lagrange) dual problem in (29) can be optimized with a Lagrangian multiplier vector in $\Lambda$ which is given by $$\Lambda^* = \left\{ \lambda \in \Lambda \,\middle|\, \sum_{i=1}^{M} \lambda_i 1, y(i) = 1 \right\}, \quad (30)$$

where $$\mathcal{J} = \underset{i \in [M]}{\text{argmax}} \{\tilde{\Phi}_i(s_i^*; f_i)\}, \quad (31)$$

and $$1, y(i) = \begin{cases} 1 & \text{if } i \in \mathcal{J}, \\ 0 & \text{otherwise} \end{cases}. \quad (32)$$

Therefore, an optimal Lagrangian multiplier vector maximizing the Lagrange dual problem is easily solvable by considering that such Lagrangian multiplier vector is known in terms of the PS's best response. Accordingly, the rest of the analysis is focused on determining the best response of the PS.

As the elements of s are independent to one another, the PS's best response to $G_i$ is independently analyzed with $\tilde{\Phi}_i(s_i; f_i)$. Due to the convexity of $\tilde{\Phi}_i(s_i; f_i)$ with respect to $s_i$, the PS's best response to $G_i$ on domain $\mathscr{S}_i$ can be obtained from the extreme point of $\tilde{\Phi}_i(s_i; f_i)$ such that $$\tilde{s}_i^* = \underset{s_i \in \bar{S}_i}{\text{argmin}} \{\tilde{\Phi}_i(s_i; f_i)\}, \forall i \in [M]. \quad (33)$$

Subsequently, we have the following theorem to determine the best response of the PS defined in (33):

Theorem 1. The best response of the PS to $G_i$ on domain $\mathscr{S}_i$ denoted as $s_i^*$ is determined as follows for all i in [M]:

$$s_i^* = \begin{cases} s_i^{(1)} & \text{if } \tilde{\Phi}_i(s_i^{(1)}, s_{-i}; f_i) \leq \tilde{\Phi}_i(s_i^{(2)}, s_{-i}; f_i), \\ s_i^{(2)} & \text{otherwise,} \end{cases}$$

where $$s_i^{(1)} = \underset{s_i \in \mathscr{S}_i}{\text{argmin}} |\tilde{s}_i^* - s_i|,$$

and $$s_i^{(2)} = \underset{s_i \in \{S_i \setminus s_i^{(1)}\}}{\text{argmin}} |\tilde{s}_i^* - s_i|.$$

Proof. $\tilde{\Phi}_i(s_i; f_i)$ is a convex function with respect to $s_i$ for all i in [M], of which domain and range are the supersets of those of the continuous and smooth function $\Phi_i(s_i; f_i)$, respectively. Accordingly, the PS's best response to $G_i$ that minimizes $\Phi_i(s_i; f_i)$ resides near the extreme point of $\Phi_i(s_i; f_i)$ which leads to $s_i^*$ to become one of the two elements on domain $\mathscr{S}_i$ that are the most nearest to $\tilde{s}_i^*$.

The extreme point of $\tilde{\Phi}_i(s_i; f_i)$ is derived from $$\frac{\partial \tilde{\Phi}_i}{\partial s_i} = 0,$$

which is given by $$\tilde{s}_i^* = \frac{c_i f_i}{L \mu_i}. \quad (34)$$

Accordingly, the best response of the PS can be calculated as described in Algorithm 1 of FIG. 10*b*, and the obtained best response is guaranteed to be the PS's optimal strategy of the DC Stackelberg game with backward induction.

An analysis of the EDs' side of the Stackelberg game, which are leaders, according to one embodiment of the present disclosure will be described.

The PS's strategical response to the strategy of each $ED_i$ is found to be $$\tilde{s}_i^* = \frac{c_i f_i}{L\mu_i}$$

on the continuous domain. With the knowledge on $\tilde{s}_i^*$, the utility function of the $ED_i$ defined in (22) is updated as a function, $\tilde{\Psi}_i: \tilde{\mathscr{F}}_i \to \mathbb{R}$, which is given by $$\tilde{\Psi}_i(f_i; f_{-i}) = \frac{R^c \Gamma_i}{\sum_{i'=1}^{M} n_{i'} \Gamma_{i'}} - \eta_i \kappa_i \left( \alpha_i f_i^2 + \frac{1}{\mu_i} f_i^3 \right) + \xi_i, \quad (35)$$

where $$\alpha_i = L_{c_i}, \quad (36)$$

and $$\xi_i = \frac{R^b}{\sum_{i'=1}^{M} n_{i'}} - \eta_i C_i^{tx}. \quad (37)$$

The evaluated value of each $ED_i$ in the updated utility function is denoted as $\Gamma_i$ and defined as follows:

$$\Gamma_i = \begin{cases} \Gamma_i^{wl} & \text{with } WL\text{-based distribution,} \\ \Gamma_i^{ct} & \text{with } CT\text{-based distribution,} \\ 1 & \text{with uniform distribution,} \end{cases}$$

where $$\Gamma_i^{wl} = \frac{c_i}{\mu_i} f_i + L, \quad (39)$$

and $$\Gamma_i^{ct} = \frac{1}{1 + \delta \left( T_i^{tx} + \tau_i + \frac{2}{\mu_i} + \frac{\alpha_i}{f_i} \right)}. \quad (40)$$

The utility function $\tilde{\Psi}_i(f_i; f-1)$ is a concave function with respect to $f_i$ for all $i$ in $[M]$.

In determining the strategy, the $ED_i$ is aware of the constraint on the PS's strategy, such that $1 \leq s_i \leq n_i$. Hence, the $ED_i$ restricts the domain for $f_i$ as the set of all positive real numbers that induce $\tilde{s}_i^*$ to be in $\mathscr{S}_i$, given by $$\tilde{\mathscr{F}}_i = \left\{ f_i \in \tilde{\mathscr{F}}_i \mid f_i = q \frac{L\mu_i}{c_i}, \text{ for some } q \in \mathcal{S}_i \right\}$$

With such domain consideration, the utility function of $ED_i$ is redefined as $\Psi_i: \tilde{\mathscr{F}}_i \to \mathbb{R}$, such that $\Psi_i(f_i) = \tilde{\Psi}_i(f_i)$ for $f_i$ in $\tilde{\mathscr{F}}_i$. Accordingly, the best response of each $ED_i$ to the other EDs and the PS is given by $$f_i^* = \underset{f_i \in \mathscr{F}_i}{\operatorname{argmax}} \{ \Psi_i(f_i; f_{-i}) \} \quad (41)$$

subject to $$\Psi_i(f_i; f_{-i}) \geq \epsilon, \text{for } \epsilon \in \mathbb{R}^+, \quad (42)$$

where $\epsilon$ is the prearranged amount of profit guaranteed to each ED by the PS.

The best response of $ED_i$ can be obtained from the extreme point of $\tilde{\Psi}_i(f_i; f_{-i})$, which is denoted as $\tilde{f}_i^*$. The extreme point can be found by solving a function $\Omega_i: \tilde{\mathscr{F}}_i \to \mathbb{R}$, such that $\Omega_i(f_i; f_{-i}) = 0$ implies $$\frac{\partial \tilde{\Phi}_i}{\partial f_i} = 0.$$

Subsequently, we have the following theorem to determine the best response of each $ED_i$ defined in (41).

Theorem 2. The best response of the $ED_i$ on domain $\mathscr{F}_i$, denoted as $f_i^*$ is determined as follows:

$$f_i^* = \begin{cases} f_i^{(1)} & \text{if } \Psi_i(f_i^{(1)}; f_{-i}) \geq \Psi_i(f_i^{(2)}; f_{-i}), \\ f_i^{(2)} & \text{otherwise,} \end{cases}$$

where $$f_i^{(1)} = \underset{f_i \in \mathscr{F}_i}{\operatorname{argmin}} |\tilde{f}_i^* - f_i|,$$

and $$f_i^{(2)} = \underset{f_i \in \{\mathscr{F}_i \setminus f_i^{(1)}\}}{\operatorname{argmin}} |\tilde{f}_i^* - f_i|.$$

Proof. $\Psi_i(f_i; f_{-i})$ is a concave function with respect to $f_i$, of which domain and range are the supersets of those of the continuous and smooth function $\tilde{\Psi}_i(f_i; f_{-i})$, respectively. Accordingly, the best response of $ED_i$ that maximizes $\Psi_i(f_i; f_{-i})$ resides near the extreme point of $\tilde{\Psi}_i(f_i; f_{-i})$ which leads $f_i^*$ to become one of the two elements on domain $\mathscr{S}_i$ that are the most nearest to $\tilde{f}_i^*$.

Accordingly, the best response of the $ED_i$ can be calculated as described in Algorithm 2 of FIG. 10c, where $p_{task} = \{L, \delta, \epsilon\}$, and $p_{md} = \{n, c, \mu, \kappa, \eta, \tau, T^{tx}, C^{tx}\}^{10}$. The best responses of the EDs are denoted as a vector, $f^* = (f_1^*, f_2^*, \ldots, f_M^*)$ of which the domain is set as $\mathscr{S} = \Pi_{i \in [M]} \mathscr{S}_i$. The best responses of the EDs, $f^*$, is guaranteed to converge to the EDs' optimal strategies of the PM subgame and the DC Stackelberg game with an iterative update process on the EDs' best responses.

As the solution of the Stackelberg game, the Stackelberg Equilibrium (SE) is a stable point where all players' objectives are optimized given the other players' best responses. In the Stackelberg game formulated in the present disclosure, the SE is obtained as a unique NE. Specifically, the unique NE is obtained in the PM subgame, which becomes the subgame perfect equilibrium (SPE) of the DC Stackelberg game with backward induction. The definitions of NE and SPE in the PM subgame and the DC Stackelberg game are given as follows.

Definition 1 (NE in the PM subgame). A strategy profile, f*, is a Nash equilibrium of the PM subgame if f* is a best response to $f_{-i}$ for all i in [M], such that $\Psi_i(f_i^*; f_{-i}^*) \leq \Psi_i(f_i; f_{-i}^*)$, for all strategies $f_i \neq f_i^*$.

Definition 2 (SPE in the DC Stackelberg game). A strategy profile $\alpha^* = (f^*, s^*)$ is a subgame perfect equilibrium of the DC Stackelberg game if f* is the Nash equilibrium of the PM subgame, and $s_i^*$ is a best response to f* for all i in [M], such that $\Phi_i(s_i^*; f_i) \leq \Phi_i(s_i; f_i)$, for all strategies $s_i \neq s_i^*$.

The SPE is the strategy of the main game that represents the NE in all of its subgames, which indicates that every SPE is also a NE. Hence, the SPE of a game implies that none of the players benefits by unilaterally deviating from the equilibrium, and thus rational players do not deviate from the SPE once it is reached. Consequently, a set of strategy profiles of the EDs and the PS (f*, s*) that achieve SPE become the solution of the DC Stackelberg game.

Subsequently, the unique NE of the subgame implies that a unique SPE in the main game with backward induction. Hence, the uniqueness of SPE in the DC Stackelberg game is guaranteed by verifying that the PM subgame has a unique NE.

Theorem 3 (Uniqueness of NE). There exists a unique Nash equilibrium in the PM subgame, and so it does in the DC Stackelberg game.

Proof. The utility function of $ED_i$ in the PM subgame is a strictly concave function with respect to $f_i$ for all i in [M]. This guarantees that there exists a unique NE in the PM subgame. With backward induction, such unique NE of the PM subgame is the SPE of the DC Stackelberg game, which becomes the unique NE as well.

By Theorem 3, it is guaranteed that a unique NE exists in the PM subgame as is in the DC Stackelberg game. The unique NE can be reached with Algorithm 3 shown in FIG. 10d, in which EDs continually improve their strategies in a randomized order. This procedure is referred to as asynchronous best-response dynamics, which updates the best responses of a subset of players in response to the others' best responses by turns until reaching an equilibrium point.

Theorem 4. The best response dynamics in Algorithm 3 converges to the unique NE of the PM subgame with the best-response dynamics.

Proof. We verify that Algorithm 3 converges to the unique NE with the characteristic of a weak acyclic game, which is defined as follows.

Definition 3 (Weak acyclic game). A game is a weak acyclic game if there exists a best-response improvement path to the NE of the game from every initial strategy.

The existence of the unique NE in every subgame of a game implies that the game and all of its subgames are weakly acyclic. The uniqueness of the PM subgame has been shown in Theorem 3, which indicates that the PM subgame is a weak acyclic game. This implies that there exists a best-response improvement path to the unique NE in the PM subgame regardless of the initial strategies of the players. Hence, the asynchronous best-response dynamics in Algorithm 3 converges to the unique NE.

Accordingly, Algorithm 2 and Algorithm 3 lead to the unique NE of the PM subgame. The best response of the PS in Algorithm 1 with the NE of the PM subgame obtains the SPE of the DC Stackelberg game.

As for minimal incentive and frequency requirements, the amount of base incentive to assure EDs of the pre-agreed minimum profit is determined based on the EDs' hardware specifications, network conditions, and preferences. For the analysis, the utility of $ED_i$ is separated into two parts: $\Psi_i^{(1)}$: $\mathscr{F}_i \to \mathbb{R}^+$ and $\Psi_i^{(2)}$: $\mathscr{F}_i \to \mathbb{R}$, such that $\Psi_i(f_i; f_{-i}) = \Psi_i^{(1)}(f_i; f_{-i}) + \Psi_i^{(2)}(f_i)$ on $\mathscr{S}$. The functions are respectively given by $$\psi_i^{(1)}(f_i : f_{-i}) = R^c \frac{\gamma_i}{\sum_{i'=1}^{M} n_{i'} \gamma_{i'}}, \quad (43)$$

and $$\psi_i^{(2)}(f_i) = \xi_i - \eta_i \kappa_i \left( \frac{1}{\mu_i} f_i^3 + \frac{L}{c_i} f_i^2 \right). \quad (44)$$

The strategies of all EDs influence the first part of the $ED_i$'s utility, $\Psi_i^{(1)}(f_i; f_{-i})$, while the second part, $\Psi_i^{(2)}(f_i)$, is determined only by the strategy of $ED_i$. The range of $\Psi_i(f_i; f_{-i})$ is a positive real number, and thus the utility of $ED_i$ is greater than $\Psi_i^{(1)}(f_i)$ for all i in [M], such that $$\Psi_i(f_i; f_{-i}) > \Psi_i^{(2)}(f_i), \forall f_i \in \mathscr{F}_i, \quad (45)$$

Accordingly, the $ED_i$ controls the profit gain on $\Psi_i^{(2)}(f_i)$, which is a strictly decreasing concave function with respect to $f_i$ for all i in [M]. Consequently, the constraint (42) is reformulated into a stricter constraint given by $$\Psi_i^{(2)}(f_i^{lb}) \geq \epsilon, \forall i \in [M]. \quad (46)$$

Here, $f_i^{lb}$ is the minimal feasible frequency of the $ED_i$ that induces $s_i$ to be in $\mathscr{S}_i$. The lower bound of $f_i$ for all i in [M], is given by $$f_i^{lb} = \min \left\{ f \in [f_i^{min}, f_i^{max}] \mid f = q \frac{L\mu_i}{c_i}, \text{ for some } q \in S_i \right\}.$$

The constraints in (46) are further reformulated as a single constraint, such that $$\min_{i \in [M]} \{\Psi_i^{(2)}(f_i^{lb})\} = \epsilon. \quad (47)$$

Accordingly, the base incentive is found to be $$R^b = \sum_{i \in [M]} n_i (r^{max} + \epsilon), \quad (48)$$

where the largest amount of incentive required among the participating EDs is denoted as $r^{max}$, which is given by $$r^{max} = \max_{i \in [M]} \left\{ \eta_i \kappa_i \left[ \frac{1}{\mu_i} (f_i^{lb})^3 + \frac{L}{c_i} (f_i^{lb})^2 \right] + \eta_i C_i^{tx} \right\}. \quad (49)$$

With $R^b$ given as in (48), a set of $ED_i$'s frequency that guarantees to the $ED_i$ is given by, for all i in [M], $$\mathcal{H}_i = \{f \in [f_i^{lb}, f_i^{max}] | \Psi_i^{(2)}(f) \geq \epsilon\}, \quad (50)$$

The upper bound of $f_i$ becomes the largest element in $H_i$ that induces $\mathscr{S}_i$ to be in $s_i$ for all i in [M], such that $$f_i^{ab} = \max\left\{f \in \mathcal{H}_i \mid f = q\frac{L\mu_i}{c_i}, \text{ for some } q \in \mathcal{S}_i\right\}.$$

With the determined base incentive and frequency domains, the NE of the DC Stackelberg game is achieved with Algorithm 4 shown in FIG. 10e, when the requirements for the game are satisfied, such that $R > R^b$ and $f_i^{ub} \geq f_i^{lb}$ for all i in [M].

The aforementioned system may be implemented in the form of a hardware component, a software component, and/or a combination of a hardware component and a software component. For example, the system and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processor may perform an operating system (OS) and one or more software applications executed on the OS. Furthermore, the processor may access, store, manipulate, process, and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction, or a combination of one or more of them and may configure a processor so that it operates as desired or may instruct the processor independently or collectively. The software and/or data may be embodied in a machine, component, physical device, virtual equipment, or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include program instructions, data files, and data structures solely or in combination. The program instructions recorded on the medium may be specially designed and configured for the embodiment or may be known and usable to those skilled in computer software. Example of the computer-readable medium may include magnetic media such as hard disks, floppy disks and magnetic tapes, optical media such as CD-ROMs and DVDs, and magneto-optical media such as floptical disks, and hardware devices specially configured to store and execute program instructions such as ROM, RAM, and flash memory. Examples of the program instructions may include machine-language code, such as code written by a compiler, and high-level language code executable by a computer using an interpreter.

As described above, although the embodiments have been described in connection with the limited embodiments and the drawings, those skilled in the art may modify and change the embodiments in various ways from the description. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, other implementations, other embodiments, and equivalents to the claims are also within the scope of the following claims.

What is claimed is:

1. A coding and Incentive-based distributed computing management system comprising:
    a parameter server (PS) that publishes a gradient descent computation task to update parameters of distributed computing, sends the published task to a plurality of end devices, and groups the plurality of end devices into clusters by receiving related information from the plurality of end devices, determines the number of stragglers in each cluster and sends the determined number of stragglers to the plurality of end devices, along with an encoding scheme for gradient descent computation, and distributes incentive to the plurality of end devices based on encoded results;
    the plurality of end devices (ED) that receive the published task from the parameter server, sends an intention to participate in the published task and related information to the parameter server, determine CPU-cycle frequencies by receiving information on the grouping of the plurality of end devices and related information from the parameter server, and perform encoding for gradient descent computation and send a computed gradient to the parameter server;
    a base station that communicates with the plurality of end devices via wireless communication so as to enable communication between the plurality of end devices and the parameter server and communicates with the parameter server via a wired link; and
    a data shard (DS) that stores data processed in the plurality of end devices and the parameter server and comprises local data storage for each of the plurality of end devices.

2. The coding and Incentive-based distributed computing management system of claim 1, wherein the plurality of end devices formulate a strategic competition with the parameter server as a Stackelberg game, and the plurality of end devices operating as leaders of the game determine the CPU-cycle frequencies to balance each end device's computing speed and energy consumption for obtaining maximum utility with incentive mechanisms.

3. The coding and Incentive-based distributed computing management system of claim 2, wherein the parameter server aims at minimizing latency of the distributed computing, operate as a follower of the Stackelberg game to determine the load allocation for each end device based on the CPU-cycle frequencies determined by the plurality of end devices, and then achieves the Stackelberg equilibrium which is a unique Nash equilibrium of the Stackelberg game.

4. The coding and Incentive-based distributed computing management system of claim 1, wherein the plurality of end devices compete with one another to earn incentive by forming a profit maximization (PM) subgame among the plurality of end devices, and, with the best responses of the end devices determined in the PM subgame, the parameter server allocates workload to the corresponding end devices to minimize the task completion latency as a single follower.

5. The coding and Incentive-based distributed computing management system of claim 4, wherein the parameter server determines the optimal number of stragglers in each cluster to minimize the task completion latency, determines the load allocation based on the optimal number of stragglers, reformulates a Lagrange dual problem to determine the optimal number of stragglers, and determines the optimal number of stragglers by using an optimal Lagrangian multiplier vector maximizing the Lagrange dual problem.

6. The coding and Incentive-based distributed computing management system of claim 1, wherein the parameter server encourages the plurality of end devices to participate by providing base incentive guaranteeing minimum incentive to the plurality of end devices, by using incentive distributions comprising a base incentive distribution and a competition incentive distribution, and, upon receiving evaluation results from all of the plurality of end devices, distributes competition incentive to the plurality of end devices to provide incentive based on the evaluation results.

7. The coding and Incentive-based distributed computing management system of claim 6, wherein the plurality of end devices receive the base incentive, which is equally distributed to all participating end devices to prevent the plurality of end devices' profit from becoming less than a predetermined minimum value.

8. The coding and Incentive-based distributed computing management system of claim 6, wherein the competition incentive proportional to the evaluation results of the tasks processed by the plurality of end devices is distributed to the plurality of end devices through the competition among the plurality of end devices to earn the incentive,
wherein the evaluation results are obtained based on evaluation criteria comprising workload (WL) and completion time (CT), and workload-based incentive is evaluated with the amount of workload that an end device processed and completion time-based incentive is evaluated with the end device's expected task completion latency.

9. A coding and Incentive-based distributed computing management method comprising:
the step in which a parameter server (PS) publishes a gradient descent computation task to update parameters of distributed computing and sends the published task to a plurality of end devices;
the step in which the plurality of end devices (EDs) receive the published task from the parameter server and send an intention to participate in the published task and related information to the parameter server;
the step in which the parameter server groups the plurality of end devices into clusters by receiving the intention to participate and related information from the plurality of end devices;
the step in which the plurality of end devices determine CPU-cycle frequencies by receiving information on the grouping of the plurality of end devices and related information from the parameter server;
the step in which the parameter server determines the number of stragglers in each cluster based on the determined CPU-cycle frequencies and sends the determined number of stragglers to the plurality of end devices, along with an encoding scheme for gradient descent computation;
the step in which the plurality of end devices perform encoding for gradient descent computation and send a computed gradient to the parameter server; and
the step in which the parameter server distributes incentive to the plurality of end devices based on encoded results.

10. The coding and Incentive-based distributed computing management method of claim 9, wherein, in the step in which the plurality of end devices determine CPU-cycle frequencies by receiving information on the grouping of the plurality of end devices and related information from the parameter server,
the plurality of end devices formulate a strategic competition with the parameter server as a Stackelberg game, and the plurality of end devices operating as leaders of the game determine the CPU-cycle frequencies to balance each end device's computing speed and energy consumption for obtaining maximum utility with incentive mechanisms.

11. The coding and Incentive-based distributed computing management method of claim 10, where, in the step in which the parameter server determines the number of stragglers in each cluster based on the determined CPU-cycle frequencies and sends the determined number of stragglers to the plurality of end devices, along with an encoding scheme for gradient descent computation,
the parameter server aims at minimizing latency of the distributed computing, operate as a follower of the Stackelberg game to determine the load allocation for each end device based on the CPU-cycle frequencies determined by the plurality of end devices, and then achieves the Stackelberg equilibrium which is a unique Nash equilibrium of the Stackelberg game.

12. The coding and Incentive-based distributed computing management method of claim 11, wherein the parameter server determines the optimal number of stragglers in each cluster to minimize the task completion latency, determines the load allocation based on the optimal number of stragglers, reformulates a Lagrange dual problem to determine the optimal number of stragglers, and determines the optimal number of stragglers by using an optimal Lagrangian multiplier vector maximizing the Lagrange dual problem.

13. The coding and Incentive-based distributed computing management method of claim 9, wherein, in the step in which the plurality of end devices perform encoding for gradient descent computation and send a computed gradient to the parameter server,
the plurality of end devices compete with one another to earn incentive by forming a profit maximization (PM) subgame among the plurality of end devices, and, with the best responses of the end devices determined in the PM subgame, the parameter server allocates workload to the corresponding end devices to minimize the task completion latency as a single follower.

14. The coding and Incentive-based distributed computing management method of claim 9, wherein, in the step in which the parameter server distributes incentive to the plurality of end devices based on encoded results, the parameter server encourages the plurality of end devices to participate by providing base incentive guaranteeing minimum incentive to the plurality of end devices, by using incentive distributions comprising a base incentive distribution and a competition incentive distribution, and, upon receiving evaluation results from all of the plurality of end devices, distributes competition incentive to the plurality of end devices to provide incentive based on the evaluation results.

15. The coding and Incentive-based distributed computing management method of claim 14, wherein, in the base incentive distribution, the plurality of end devices receive the base incentive, which is equally distributed to all participating end devices to prevent the plurality of end devices' profit from becoming less than a predetermined minimum value.

16. The coding and Incentive-based distributed computing management method of claim 9, wherein, in the competition incentive distribution, the competition incentive proportional to the evaluation results of the tasks processed by the plurality of end devices is distributed to the plurality of end devices through the competition among the plurality of end devices to earn the incentive, wherein the evaluation results are obtained based on evaluation criteria comprising workload (WL) and completion time (CT), and workload-based incentive is evaluated with the amount of workload that an end device processed and completion time-based incentive is evaluated with the end device's expected task completion latency.

* * * * *